(12) United States Patent
Kumar et al.

(10) Patent No.: US 12,079,826 B1
(45) Date of Patent: Sep. 3, 2024

(54) PREDICTING CUSTOMER INTERACTION USING DEEP LEARNING MODEL

(71) Applicant: Wells Fargo Bank, N.A., San Francisco, CA (US)

(72) Inventors: Abhishek Kumar, Bangalore (IN); Naveen Gururaja Yeri, Bangalore (IN); Dipanjan Deb, Bangalore (IN); Amit Agarwal, Bangalore (IN); Mayank Kumari, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/359,102

(22) Filed: Jun. 25, 2021

(51) Int. Cl.
*G06Q 30/0201* (2023.01)
*G06F 18/2431* (2023.01)
*G06N 20/00* (2019.01)

(52) U.S. Cl.
CPC ..... *G06Q 30/0201* (2013.01); *G06F 18/2431* (2023.01); *G06N 20/00* (2019.01)

(58) Field of Classification Search
None
See application file for complete search history.

(56) References Cited

U.S. PATENT DOCUMENTS

| | | |
|---|---|---|
| 7,580,512 B2 | 8/2009 | Batni et al. |
| 8,054,964 B2 | 11/2011 | Flockhart et al. |
| 8,983,975 B2 | 3/2015 | Kenton et al. |
| 9,015,046 B2 | 4/2015 | Pereg et al. |
| 9,026,476 B2 | 5/2015 | Bist |

(Continued)

FOREIGN PATENT DOCUMENTS

| | | |
|---|---|---|
| CA | 2957716 C | 11/2016 |
| CA | 2988282 A1 | 6/2018 |

(Continued)

OTHER PUBLICATIONS

Lewenberg et al., "Using emotions to predict user interest areas in online social networks," 2015 IEEE International Conference on Data Science and Advanced Analytics (DSAA), 2015, pp. 1-10 (Year: 2015).*

(Continued)

*Primary Examiner* — Chesiree A Walton
(74) *Attorney, Agent, or Firm* — Shumaker & Sieffert, P. A.

(57) ABSTRACT

Techniques are described for personalizing customer interactions using one or more machine learning models for customer communications. For example, a computing system includes a memory and one or more processors in communication with the memory. The one or more processors are configured to: retrieve, from a database in memory, one or more sets of emotion factor values for communication data associated with a customer over time; classify, using an emotion propensity model running on the one or more processors, the customer into an emotional profile according to the customer's typical emotional response during customer communications based on the one or more sets of emotion factor values for the communication data associated with the customer over time; and determine a probability that the customer will respond positively to a particular type of customer engagement based on the emotional profile for the customer.

20 Claims, 7 Drawing Sheets

(56) References Cited

U.S. PATENT DOCUMENTS

| | | | |
|---|---|---|---|
| 9,093,081 B2 | 7/2015 | Laperdon et al. | |
| 9,129,290 B2 | 9/2015 | Kannan et al. | |
| 9,299,268 B2 | 3/2016 | Aravkin et al. | |
| 9,483,768 B2 | 11/2016 | Singh | |
| 9,536,269 B2 | 1/2017 | Chang et al. | |
| 9,710,459 B2 | 7/2017 | Baldwin et al. | |
| 9,824,403 B2 | 11/2017 | Gangadharaiah et al. | |
| 9,967,400 B2 | 5/2018 | Eftekhari et al. | |
| 10,111,611 B2 | 10/2018 | El Kaliouby et al. | |
| 10,360,526 B2 | 7/2019 | Balakrishnan et al. | |
| 10,410,125 B1 | 9/2019 | Finkelstein et al. | |
| 10,489,451 B2 | 11/2019 | Fujita et al. | |
| 10,489,845 B2 | 11/2019 | Mullakkara Azhuvath et al. | |
| 10,691,407 B2 | 6/2020 | Yoo et al. | |
| 10,728,393 B2 | 7/2020 | Eftekhari et al. | |
| 10,748,644 B2 | 8/2020 | Shriberg et al. | |
| 10,896,428 B1 | 1/2021 | Balasubramaniam et al. | |
| 11,451,666 B1 | 9/2022 | Biswas et al. | |
| 11,900,407 B1 * | 2/2024 | Kalra | G06F 40/20 |
| 2001/0056349 A1 | 12/2001 | St. John | |
| 2003/0097329 A1 | 5/2003 | Nabe et al. | |
| 2003/0130933 A1 | 7/2003 | Huang et al. | |
| 2005/0175167 A1 | 8/2005 | Yacoub et al. | |
| 2006/0285665 A1 | 12/2006 | Wasserblat et al. | |
| 2008/0086690 A1 | 4/2008 | Verma et al. | |
| 2009/0222313 A1 | 9/2009 | Kannan et al. | |
| 2013/0035983 A1 | 2/2013 | Kursar et al. | |
| 2014/0163960 A1 | 6/2014 | Dimitriadis et al. | |
| 2014/0365272 A1 | 12/2014 | Hurewitz | |
| 2015/0213002 A1 | 7/2015 | Gou et al. | |
| 2016/0335252 A1 | 11/2016 | Brunet et al. | |
| 2017/0228745 A1 | 8/2017 | Garcia et al. | |
| 2019/0050875 A1 * | 2/2019 | McCord | G06F 40/30 |
| 2019/0147043 A1 | 5/2019 | Moskowitz | |
| 2019/0318219 A1 | 10/2019 | Arora et al. | |
| 2019/0325897 A1 * | 10/2019 | Liu | H04M 3/5175 |
| 2020/0013071 A1 * | 1/2020 | Sri | G06Q 30/02 |
| 2020/0020454 A1 | 1/2020 | McGarvey et al. | |
| 2020/0074156 A1 | 3/2020 | Janumpally et al. | |
| 2020/0082056 A1 | 3/2020 | Hasegawa | |
| 2020/0106882 A1 | 4/2020 | Fang et al. | |
| 2020/0160356 A1 | 5/2020 | Mccord | |
| 2020/0294670 A1 | 9/2020 | Kotikela et al. | |
| 2021/0192332 A1 * | 6/2021 | Gangotri | G10L 15/30 |
| 2021/0350385 A1 * | 11/2021 | Ellison | G06N 20/00 |
| 2022/0103589 A1 | 3/2022 | Shen et al. | |

FOREIGN PATENT DOCUMENTS

| | | | |
|---|---|---|---|
| CN | 103811009 A | 5/2014 | |
| CN | 102831184 B | 3/2016 | |
| CN | 106022676 A | 10/2016 | |
| CN | 106530127 A | 3/2017 | |
| CN | 106539804 A | 3/2017 | |
| CN | 107908782 A | 4/2018 | |
| CN | 108108352 A | 6/2018 | |
| CN | 108108433 A | 6/2018 | |
| CN | 110516593 A | 11/2019 | |
| CN | 111048075 A | 4/2020 | |
| CN | 111049998 A | 4/2020 | |
| CN | 111324865 A | 6/2020 | |
| CN | 111767736 A | 10/2020 | |
| CN | 112182361 A | 1/2021 | |
| IN | 201841033441 A | 3/2020 | |
| JP | 2018180628 A | 11/2018 | |
| KR | 101600509 B1 | 2/2016 | |
| KR | 20190053982 A | 5/2019 | |
| KR | 20200005753 A | 1/2020 | |
| WO | 2015087323 A1 | 6/2015 | |
| WO | 2019222742 A1 | 5/2019 | |
| WO | 2020056519 A1 | 3/2020 | |

OTHER PUBLICATIONS

Mohamed Mostafa, Modelling and Analysing Behaviours and Emotions via Complex User Interactions. arXiv:1902.07683, Feb. 20, 2019 (Year: 2019).*

Hsiao et al., "A novel framework for customer complaint management," The Service Industries Journal: vol. 36, No. 13-14, Feb. 12, 2016, 675-698 pages.

McQuilken et al., "The influence of guarantees, active requests to voice and failure severity on customer complaint behavior," International Journal of Hospitality Management, vol. 30, Issue 4, Dec. 2011, 953-962 pages.

Tsai et al., "Financial keyword expansion via continuous word vector representations", In Proceedings of the 2014 Conference on Empirical Methods in Natural Language Processing (EMNLP), Oct. 25-29, 2014, 1453-1458 pp.

Luo et al., "Beyond Polarity: Interpretable Financial Sentiment Analysis with Hierarchical Query-driven Attention", IJCAI'18: Proceedings of the 27th International Joint Conference on Artificial Intelligence, Jul. 13, 2018, 4244-4250 pp.

Wang et al., "Financial sentiment analysis for risk prediction", International Joint Conference on Natural Language Processing, Oct. 14-18, 2013, 802-808 pp.

Mohammad, "Obtaining reliable human ratings of valence, arousal, and dominance for 20,000 english words", Association for Computational Linguistics, Jul. 15-20, 2018, 11 pp.

"Loughran-McDonald Sentiment Word Lists Financial dictionary", Retrieved from https://sraf.nd.edu/textual-analysis/resources/, Nov. 30, 2020, 4 pp.

Chew-Yean, "Emotion Detection and Recognition from Text Using Deep Learning" Devblogs, Nov. 29, 2015, 8 pp.

"Emotion Analysis", Komprehend, retrieved from https://www.paralleldots.com/emotion-analysis, Nov. 30, 2020, B pp.

Park et al., "Emotion Recognition from Text Stories Using an Emotion Embedding Model", IEEE, Apr. 20, 2020, 5 pp.

U.S. Appl. No. 16/781,620, filed Feb. 4, 2020, naming inventors Mann et al.

U.S. Appl. No. 17/338,167, filed Jun. 3, 2021, naming inventors Kumar et al.

U.S. Appl. No. 17/397,494, filed Aug. 9, 2021, naming inventors Kumar et al.

"Hyper-Personalization: The Next Wave of Customer Engagement", SmartKarrot Inc., Retrieved from: https://medium.com/smartkarrot/hyper-personalization-the-next-wave-of-customer-engagement-9e68c7a7c9ad, Mar. 15, 2019, 8 pp.

U.S. Appl. No. 17/456,334, filed Nov. 23, 2021, naming inventors Kumar et al.

U.S. Appl. No. 17/647,970, filed Jan. 13, 2022, naming inventors Kumar et al.

U.S. Appl. No. 17/647,971, filed Jan. 13, 2022, naming inventors Kumar et al.

Schrauwen, "Machine Learning Approaches to Sentiment Analysis using the Dutch Netlog Corpus", Computational Linguistics & Psycholinguistics Technical Report Series, Jul. 2010, 78 pp.

* cited by examiner

PREDICTING CUSTOMER INTERACTION USING DEEP LEARNING MODEL

TECHNICAL FIELD

The disclosure relates to computing systems, and more specifically, computing systems executing models configured to detect patterns.

BACKGROUND

An organization may interact with customers and potential customers on multiple fronts. On one side, a marketing team may solicit customers or potential customers to engage in business transactions. On another side, customers or potential customers may initiate communication with the business to seek assistance.

Sentiment analysis seeks to extract subjective information, such as affective states, from communications. Generally, an algorithm assigns an emotional scale to certain words or phrases in text to classify the polarity of the text as a whole. The polarity is expressed as either positive, negative, or neutral.

SUMMARY

In general, this disclosure describes techniques for personalizing an organization's interactions with customers using an emotion-based indexer deep learning model and an emotion classifier for customer communications associated with a business or organization. More specifically, a computing system may receive data associated with one or more customer communications (e.g., text and annotated data from text-, voice-, and/or video-based customer communications). The computing system applies the data for a customer communication as input to the emotion-based indexer deep learning model configured to determine a set of emotion factor values (e.g., numerical values representing emotion factors) for the customer communication as output. The computing system then applies the emotion factor values for the customer communication along with historical emotion factor values for previous customer communications as input to a use case specific emotion classifier. In accordance with the techniques described in this disclosure, the emotion classifier may comprise an emotion propensity model configured to classify the customer into an emotional profile according to the customer's typical emotional response during customer communications based the emotion factor values. The computing system may further determine a probability that the customer will respond positively to a particular type of customer interaction based on the emotional profile for the customer. In this way, the computing system may recommend solicitation or other communication styles for future customer interactions that are predicted to illicit a positive emotional response from customers that fall within the identified emotional profile.

All customers are different and react differently to different styles of communication. A style that works with one customer is not going to work with every customer. In-person bank tellers may become adept at reading a customer and reacting to individual cues. A local bank branch may know which customers will react best to a solicitation. However, in an increasingly digitized world, most bank interactions are impersonal such that is difficult, if not impossible, for a bank teller to get a personal feel for most customers' emotional states and/or communication preferences. The disclosed techniques provide solutions to this problem by efficiently classifying customers based on the emotion factor indices of the customers' communications.

In some examples, a computing system includes a memory and one or more processors in communication with the memory and configured to: retrieve, from a database, one or more sets of emotion factor values for communication data associated with a customer over time, wherein each set of emotion factor values includes emotion factor values for a given customer communication, and wherein each emotion factor value indicates a measure of a particular emotion factor in the given customer communication; classify, using an emotion propensity model running on the one or more processors, the customer into an emotional profile according to the customer's typical emotional response during customer communications based on the one or more sets of emotion factor values for the communication data associated with the customer over time; and determine a probability that the customer will respond positively to a particular type of customer engagement based on the emotional profile for the customer In some examples, this disclosure is directed to a method comprising: retrieving from a database, by one or more processors, one or more sets of emotion factor values for communication data associated with a customer over time, wherein each set of emotion factor values includes emotion factor values for a given customer communication, and wherein each emotion factor value indicates a measure of a particular emotion factor in the given customer communication; classifying, using an emotion propensity model running on the one or more processors, the customer into an emotional profile according to the customer's typical emotional response during customer communications based on the one or more sets of emotion factor values for the communication data associated with the customer over time; and determining a probability that the customer will respond positively to a particular type of customer engagement based on the emotional profile for the customer.

In some examples, this disclosure is directed to a computer-readable medium comprising instructions that, when executed, cause one or more processors to: retrieve, from a database, one or more sets of emotion factor values for communication data associated with a customer over time, wherein each set of emotion factor values includes emotion factor values for a given customer communication, and wherein each emotion factor value indicates a measure of a particular emotion factor in the given customer communication; classify, using an emotion propensity model running on the one or more processors, the customer into an emotional profile according to the customer's typical emotional response during customer communications based on the one or more sets of emotion factor values for the communication data associated with the customer over time; and determine a probability that the customer will respond positively to a particular type of customer engagement based on the emotional profile for the customer.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
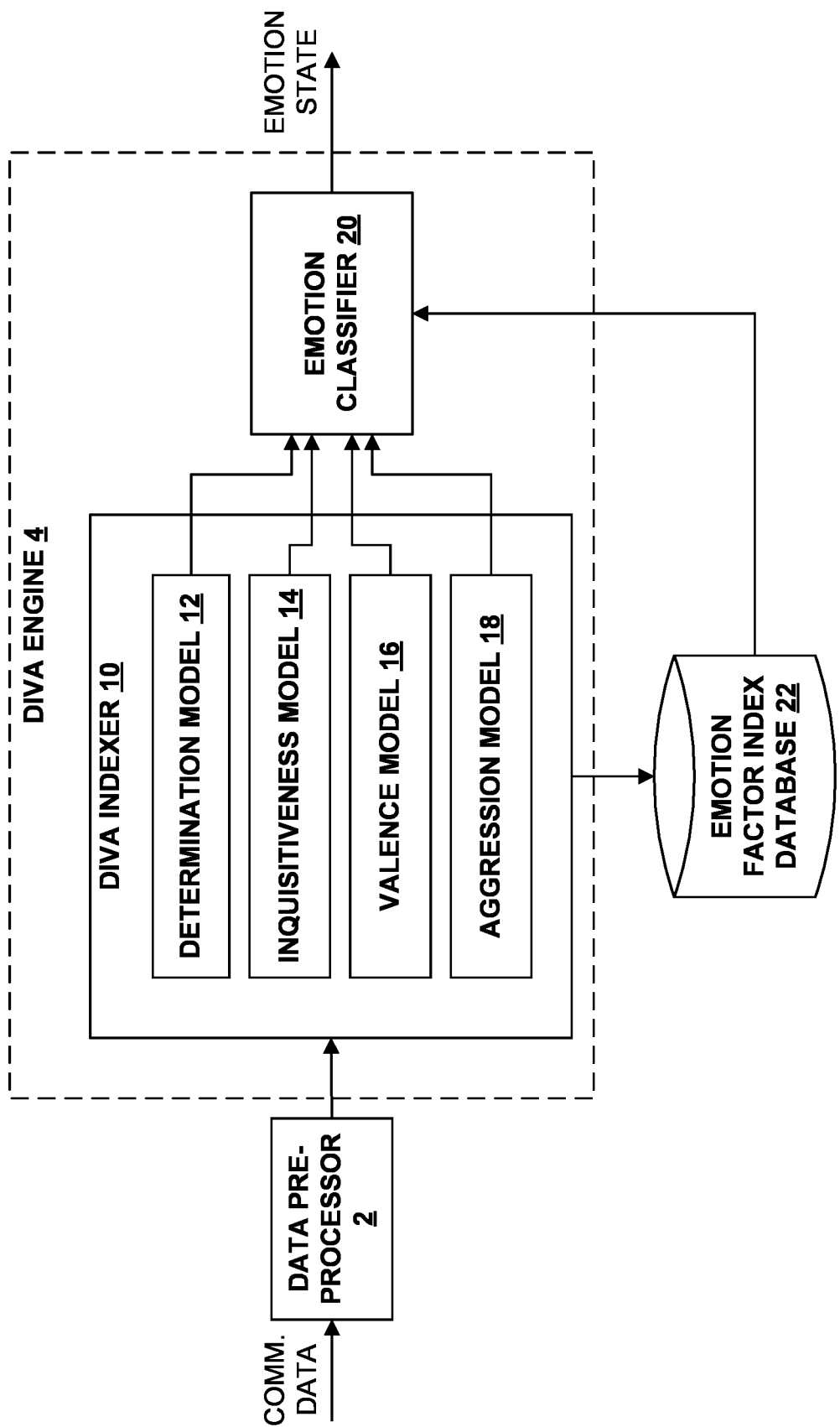
FIG. 1 is a block diagram illustrating an example operation of an emotion classification engine in accordance with techniques of this disclosure.

FIG. 1 is a block diagram illustrating an example operation of an emotion classification engine in accordance with techniques of this disclosure.

The emotion classification engine illustrated in FIG. 1 is DIVA engine 4, which refers to the four emotion factor values of Determination, Inquisitiveness, Valence, and Aggression that the engine is configured to determine from input communication data and use to classify the communication data as being associated with a given emotion state. In the illustrated example of FIG. 1, DIVA engine 4 includes a DIVA indexer 10 and an emotion classifier 20. The DIVA indexer 10 may comprise four machine learning models trained to output the four different emotion factor values for communication data. The emotion factor values may be represented as numerical numbers (e.g., between 0 and 1, between −2 and 2, or the like) reflecting the intensity of a specified emotion present in the communication data. For communication data representing a customer communication, for example, a determination model 12 may be trained to output a determination value, an inquisitiveness model 14 may be trained to output an inquisitiveness value, a valence model 16 may be trained to output a valence value, and an aggression model 18 may be trained to output an aggression value. DIVA indexer 10 may output the four emotion factor values to an emotion classifier 20, which may be a machine learning model or a rule-based model, configured to classify the communication data into an associated emotion state (e.g., angry, curious, happy, etc.) based on the four emotion factor values.

DIVA engine 4 may be supported on one or more servers or other computing systems or devices within an organization network. For example, DIVA engine 4 may comprise software code executing on processors or processing circuitry of one or more computing systems that may be included in a centralized or distributed network of disparate computing devices. In some examples, one or more of the emotion factor models 12, 14, 16, and 18 and emption classifier 20 may each be supported by different computing systems or devices within the network. In other examples, DIVA indexer 10 may be supported on the same computing system, and emotion classifier 20 may be supported on the same computing system or a different computing system within the network.

Upon receipt of communication data representing a customer communication for processing, data pre-processor 2 may perform preprocessing to prepare the communication data for application to the DIVA engine 4 machine learning models. The communication data representing a customer communication may also be saved to a database in memory. The four machine learning models 12, 14, 16, and 18 of DIVA indexer 10 are trained to recognize certain emotion factors within communication data and output emotion factor values reflecting the presence and intensity of those emotions. The emotion factor values output from DIVA indexer 10 may be saved to an emotion factor index database 22 and an ID may be assigned to the communication data in memory to associate the communication data with the emotion factor values. The saved emotion factor values may also be associated with a customer who is the source of the communication data. In some examples, the emotion classifier 20 may also retrieve historic, saved emotion factor values for previous communication data associated with the customer from the emotion factor index database 22 as additional input to determine an emotion state of current communication data of the customer. The use of historic emotion factor values of the customer may enable emotion classifier 20 to more accurately classify an emotion state of a customer associated with the current communication data by identifying trends or sudden changes in the emotion factor values of the customer over time. Emotion states may be saved to an emotion state database (not shown in FIG. 1) and associated with the respective communication data, originating customer, and/or emotion factor values.

In some examples, instead of only relying on the specific customer's own historic emotion factor values, emotion classifier 20 may use historic emotion factor values associated with a grouping or profile of customers that includes the specific customer. For example, customer profiles may be identified for groups of customers based on geographical location, education level, age, profession, socioeconomic status, or other categorization. The use of customer profiles may provide a larger historic data set from which emotion classifier 20 may learn to identify emotional trends over time.

Conventional sentiment analysis systems generally classify communication data as being positive, neutral, or negative. Unlike these conventional systems, the emotion classification engine described herein, e.g., DIVA engine 4 of FIG. 1, includes an indexer, e.g., DIVA indexer 10 of FIG. 1, configured to identify the existence and intensity of four emotions specifically useful for financial institutions when handling customer communications. In addition, the machine learning models included within the indexer, e.g., models 12, 14, 16, and 18 of FIG. 1, are trained using communication data received by financial institutions, rather than general communication data from different environments. In this way, the training of the machine learning models within DIVA indexer 10 may be more specific to financial institutions and more accurate in identifying emotive content in communications with a financial institution.

The four emotion factor values output by the machine learning models within DIVA indexer 10 may correspond to a customer's perceived determination, inquisitiveness, valence, and aggression within an inquiry, complaint, or other customer communication. The determination factor value may correspond to a level of purposefulness of the speech of the customer. In some examples, a customer communication that is highly focused on a specific topic may have a high determination factor value. In some examples, a customer communication that repeats itself may have a high determination factor value. In some examples, a customer communication that makes only a short, single statement or a broad, indefinite statement may have a low determination factor value.

The inquisitiveness value may be a measure of the level of curiosity of the speech of the customer communication. In some examples, a customer service inquiry that is probing for information about various aspects of the customer's account or the organization may have a high inquisitiveness value. In some examples, the customer communication that does not indicate an interest in learning anything may have a low inquisitiveness value. The customer who submits a communication with a low inquisitiveness value may wish to resolve any issues without receiving further information.

The valence value may be a measure of the attitude conveyed by the speech of the customer. In some examples, a customer communication that is very negative may have a low valence value. In some examples, a customer communication that is cheerful may have a high valence value. The aggression value may be a measure of the aggressiveness of the speech of the customer communication. In some examples, a customer communication that is brusque may have a high aggression value. In some examples, a customer communication that uses an authoritative tone of voice may have a high aggression value. In some examples, a customer communication that sounds meek or pathetic may have a low aggression value.

An emotion classifier, e.g., emotion classifier 20 of FIG. 1, within the emotion classification engine described herein is configured to classify an emotional state of the customer communication based at least in part on the four emotion factor values output from the machine learning models within DIVA indexer 10 for the customer communication. In some examples, emotion classifier 20 may comprise a machine learning-based or rule-based algorithmic model configured to map the emotion factor values for the customer communication to an emotional state, emotion score, or other emotional indicator. In one example, emotion classifier 20 may have access to a library of emotional states algorithmically tied to different combinations of emotion factor value inputs. The emotional state library may contain emotion states such as "curious," "trusting," "disgruntled," "interesting" etc. As described in this disclosure, the emotion classifier included within the emotion classification engine described herein may be use case specific. In accordance with the techniques described in this disclosure, the emotion classifier may comprise an emotion propensity model configured to classify a customer associated with the customer communication into an emotional profile according to the customer's typical emotional response during customer communications based on the emotion factor values.

DIVA indexer 10 and emotion classifier 20 may include functions (e.g., machine learning algorithms and/or rule-based algorithms) configured to be executed by processors. In some examples, the machine learning models within DIVA indexer 10 implement supervised learning, e.g., classify sets of data into groups. For example, a set of data, such as a sequence of code pairs representing customer communication data, may be classified into four values (determination, inquisitiveness, valence, and aggression). The function may include nodes, layers, and connections, and the function may be represented by equations having a plurality of variables and a plurality of known coefficients.

Machine learning algorithms, such as those of DIVA engine 4, may be trained using a training process to create data-specific models. After the training process, the created models may be capable of determining an output data set based on an input data set (e.g., match a sequence of text data strings representing a customer service inquiry to one or more known emotion factor values or emotion states). The training process may implement one or more sets of training data to create the models.

A computing system may be configured to train the deep learning models of the DIVA indexer (determination model 12, inquisitiveness model 14, valence model 16, and aggression model 18) based on a set of training data that includes a plurality of customer communications in one or more memories or storage systems within the organization network, in which each customer communication of the plurality of customer communications is pre-categorized as associated with at least one emotion factor value. The deep learning models may include an artificial neural network, such as an RNN. During training of the model, an RNN may identify a plurality of patterns in a plurality of sequences of events. For example, the RNN may observe word phrases of customer service inquiries known to be indicative of an aggressive emotion. After the model is trained, the model may accept a customer communication as an input and output an emotion factor value (e.g., an integer between −2 and 2, inclusive) as an output, a process known as sequence classification.

A computing system may be configured to train a deep learning model like emotion classifier 20 based on a set of training data that includes a plurality of emotion factor value sets in one or more memories or storage systems within the organization network, in which each set of emotion factor values the plurality of sets of emotion factor values is pre-categorized as associated with at least a certain emotion state. The deep learning model may include an artificial neural network, such as an RNN. During training of the model, an RNN may identify a plurality of patterns in a plurality of sequences of events. For example, the RNN may observe emotion factor value combinations known to be indicative of a depressed emotion. After the model is trained, the model may accept a set of emotion factor values as an input and output an emotion classification (e.g., angry, interested, joyful, trusting, depressed, etc.) as an output, a process known as sequence classification.

The DIVA engine 4 may be implemented on any suitable computing system, such as one or more server computers, workstations, mainframes, appliances, cloud computing systems, and/or other computing systems that may be capable of performing operations and/or functions described in accordance with one or more aspects of the present disclosure. In some examples, the DIVA engine 4 may be implemented on a computing system that represents a cloud computing system, server farm, and/or server cluster (or portion thereof) that provides services to customer devices and other devices or systems, e.g., agent workstations within a financial institution. In other examples, the DIVA engine 4 may represent or be implemented through one or more virtualized compute instances (e.g., virtual machines, containers) of a data center, cloud computing system, server farm, and/or server cluster.

Figure 2:
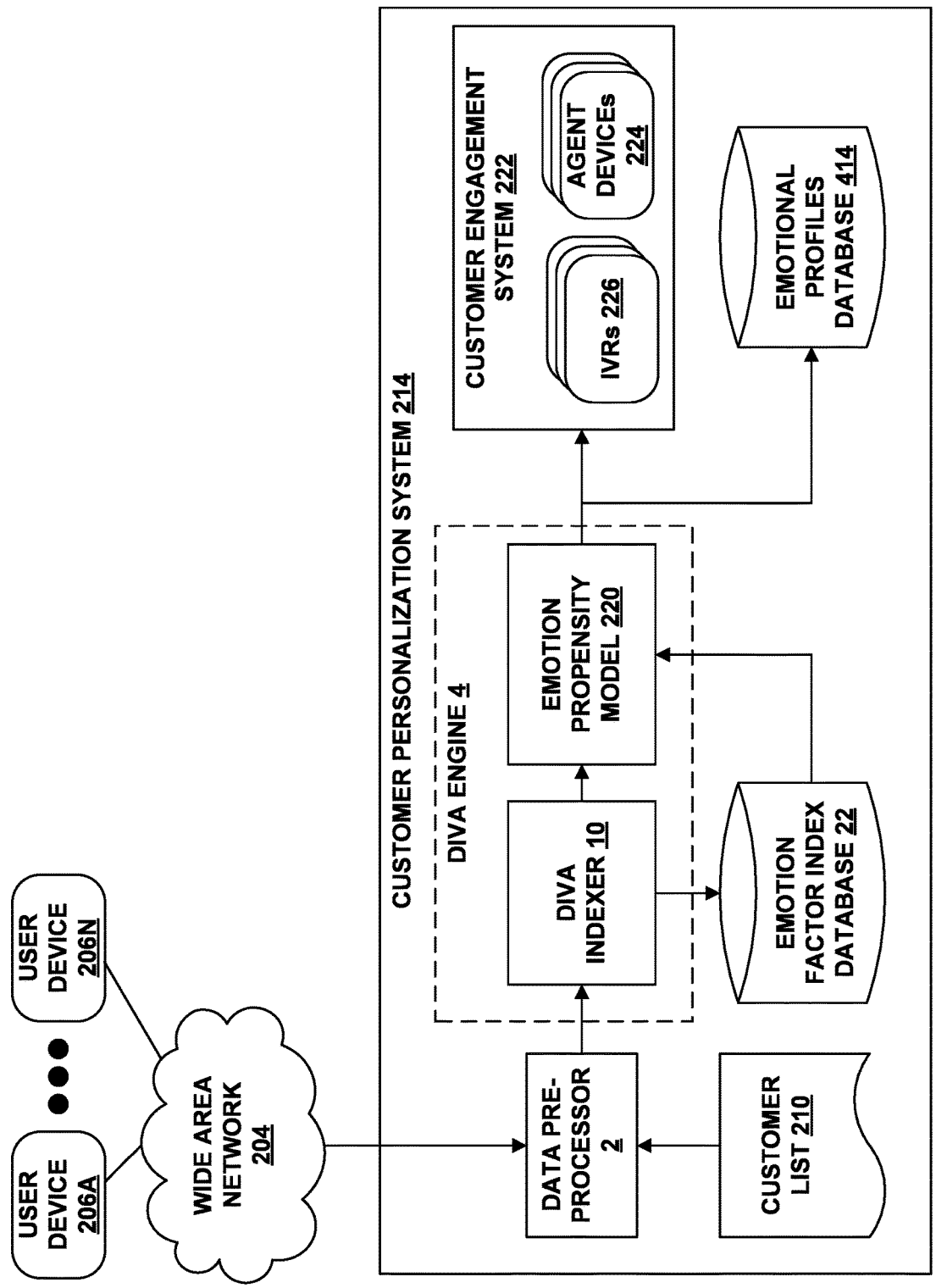
FIG. 2 is a block diagram illustrating an example customer personalization system, in accordance with the techniques of this disclosure.

FIG. 2 is a block diagram illustrating an example customer personalization system 214, in accordance with the techniques of this disclosure. Customer personalization system 214 includes DIVA engine 4 as described in FIG. 1 in which the emotion classifier is replaced with a use case specific emotion propensity model 220 configured to classify a customer into an emotional profile and determine a probability that the customer will respond positively to a particular type of customer engagement, based on emotion factor values output by the machine learning models of DIVA indexer 10. Emotion propensity model 220 may be a machine learning model or a business rule-based model, as described herein.

As illustrated in FIG. 2, one or more user devices 206A-206N (collectively "user devices 206") are in communication with customer personalization system 214 via a network 204. Customer personalization system 214 may run partially on devices in a facility configured to handle incoming communications from user devices 206 operated by users that may be customers or potential customers of a business or organization. Customer personalization system 214 may include several disparate computing systems configured to handle customer communications focused on customer accounts with the business or other services provided by the business, e.g., servicing existing accounts, opening new accounts, servicing existing loans, and opening new loans. In some examples described in this disclosure, organization system 214 may comprise a customer service center of a bank or other financial institution. A contact center of the customer personalization system 214 may allow customers to speak to a live person when resolving service issues and/or leave a voice message detailing one or more service issues. Additionally, or alternatively, customers may submit messages (e.g., service inquiries or complaints) via text channels such as email, text messaging, and social media messaging.

User devices 206 may be any suitable communication or computing device, such as a conventional or landline phone, or a mobile, non-mobile, wearable, and/or non-wearable computing device capable of communicating over network 204. For example, each user device of user devices 206 may include any one or combination of a landline phone, a conventional mobile phone, a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, and non-mobile computing device that may perform operations in accordance with one or more aspects of the present disclosure. One or more of user devices 206 may support communication services over packet-switched networks, e.g., the public Internet, including Voice over Internet Protocol (VOIP). One or more of user devices 206 may also support communication services over circuit-switched networks, e.g., the public switched telephone network (PSTN).

Each of user devices 206 is operated by a user that may be a customer or a potential customer of the business or organization that provides customer personalization system 214. In the case of a business or corporate customer, the user may be a representative of the business or a corporate customer. In some examples, the user may be a customer who interacts with the business or organization through account inquiries, service inquiries etc. The business or organization may wish to solicit to the customer for a new or existing product or service provided by the business or organization that provides customer personalization system 214. In one or more cases where the user has previously interacted with the business or organization by communications sent to the business or organization, the communications may be indicative of an emotional profile, wherein the customer may be more receptive to a particular type of solicitation or customer engagement. For example, customer personalization system 214 may receive a message from a user device of user device 206. In some examples, the message may contain language indicative of a level of determination, inquisitiveness, valence, or aggression. A first message sent by a first customer may contain language indicative of a higher level of determination, inquisitiveness, valence, or aggression than a second message sent by a second customer. For example, the first message with a higher inquisitiveness level may indicate that the first customer is more receptive to solicitations about new products or services than the second customer. In another example, a first message sent by a first customer may contain language indicative of a lower level of determination, inquisitiveness, valence, or aggression than a second message sent by the same, first customer. The second message with a higher aggression level may indicate that the first customer is no longer receptive to solicitations about new products or services. It may be beneficial to automatically identify, using a machine learning model, an incoming message from a user device of user devices 206 as being associated with emotions or emotion levels in order to classify customers into emotional profiles and determine a probability that the customers will respond positively to a particular type of customer engagement based on the profiles.

The customer personalization system 214 may comprise one or more physical entities (e.g., computing devices, computer servers, quantum computers, desktop computers, tablet computers, laptop computers, smartphones, etc.) and/or virtual entities (e.g., virtual machines, application software in computing machines, a cloud computing system, etc.). In certain examples, the customer personalization system 214 may include one or more computers that process information and/or devices with embedded computers.

Network 204 and customer personalization system 214 may comprise computer networks (e.g., a wide area network (WAN), such as the Internet, a local area network (LAN), or a virtual private network (VPN)), a telephone network (e.g., the PSTN or a wireless network), or another wired or wireless communication network. Although illustrated as single entities, each of network 204 and customer personalization system 214 may include a combination of multiple networks. In some examples, network 204 may comprise a public network or a private access network through which user devices 206 may access customer personalization system 214. In some examples, customer personalization system 214 may comprise a private network of a business or organization, e.g., a bank or other financial institutions.

Customer personalization system 214 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, customer personalization system 214 represents cloud computing systems, server farms, and/or server clusters (or portions thereof) that provide services to customer devices and other devices or systems. In other examples, customer personalization system 214 may represent or be implemented through one or more virtualized compute instances (e.g., virtual machines, containers) of a data center, cloud computing system, server farm, and/or server cluster. Customer personalization system 214 may communicate with external systems via one or more networks (e.g., network 204). In some examples, customer personalization system 214 may use network interfaces (such as Ethernet interfaces, optical transceivers, radio frequency (RF) transceivers, Wi-Fi or Bluetooth radios, or the like), telephony interfaces, or any other type of device that can send and receive information to wirelessly communicate with external systems, e.g., network 204, user device 206, agent devices 224, etc.

Customer personalization system 214 may include a centralized or distributed network of disparate computing systems made up of interconnected desktop computers, laptops, workstations, wireless devices, network-ready appliances, file servers, print servers, or other computing devices. For example, customer personalization system 214 may include one or more data centers including a plurality of servers configured to provide account services interconnected with a plurality of databases and other storage facilities in which customer credentials, customer profiles, and customer accounts are stored.

Customer personalization system 214 may include systems with which a user may interact, including one or more one or more agent devices 224 used by a number of human agents that are representatives of the business or organization. Customer personalization system 214 may also include a customer engagement system 222. Customer engagement system 222 may be an in-house or third-party vendor product used by the business or organization to manage customer solicitation and other forms of customer engagement based on a variety of input data. For example, customer engagement system 222 includes one or more interactive voice response systems (IVRs) 226 that may be configured to automatically respond and/or interact with a customer based on data about the customer or the customer's emotional profile from DIVA engine 4. Similarly, customer engagement system 222 includes one or more agent devices 224 that may be configured to display or otherwise provide the data about the customer or the customer's emotional profile to the human agents and/or automatically provide prompts to the human agents on how to respond and/or interact with the customer based on the data about the customer or the customer's emotional profile.

In the illustrated example of FIG. 2, customer personalization system 214 also includes data pre-preprocessor 2, DIVA engine 4 that includes one or more machine learning models within DIVA indexer 10, as described with respect to FIG. 1, and emotion propensity model 220. Data pre-processor 2 may prepare communications data received from user device 206 for application to the one or more machine learning models within DIVA engine 4. Customer personalization system 214 may also include components necessary for collecting, storing, and maintaining data used by customer personalization system 214. The architecture of customer personalization system 214 illustrated in FIG. 2 is shown for exemplary purposes only and should not be limited to this architecture. In other examples, customer personalization system 214 may include more, fewer, or different computing systems configured to handle customer messages.

In some examples, customer personalization system 214 receives an inbound message from a user device, e.g., user device 206A, via network 204 and determines whether to route the inbound message to data pre-processor 2. In accordance with one or more techniques of this disclosure, the message may comprise communication data in the form of text or audio, such as emails, scanned letters, online chat, telephone calls, etc. A speech recognition model may be used to convert audio customer service inquiries to plain text data via natural language processing. A text image recognition model may be used to convert hand- or typewritten customer service inquiries to plain text data or text-based annotation data.

Text-based annotation data may be a combination of two sets of plain text data. The first set of plain text data may comprise the words and/or text of a customer's message to an organization, while the second set of plain text data may comprise annotations by an agent of the organization. In some examples, the customer may send communication data to an organization in the form of a visual data (e.g., letter, fax, video call, etc.), or audio data (e.g., phone call, web call, video call, etc.). The visual or audio data may have indications of emotive content not captured by the words of the message alone. In that case, an agent of the organization may add annotations, in the form of plain-text data, to the communication data for the customer's message. For example, annotations may describe the customer's behavior during a phone call, including shouting, pleading, sincere gratitude, and other descriptions of displayed emotion not conveyed through the words of the conversation alone. In some examples, annotations may describe a letter as smudged with tears, or showing red circle marks around certain words, and other descriptions of displayed emotion not conveyed through the words in the letter alone.

In some examples, customer personalization system 214 does not receive a new inbound message but will determine a probability that a customer in a customer list 210 will respond positively to a particular type of customer engagement based on historic communications with the customer. Customer list 210 may contain a plurality of customers of the organization. Each customer of the plurality of customers in customer list 210 may be associated with communication data from historic communications. Customer personalization system 214 may choose one customer from the plurality of customers in customer list 210 to determine a probability that the customer will respond positively to a particular type of customer engagement. The chosen customer may not be associated with an emotional profile or may not have been associated with an emotional profile within a predetermined amount of time. Customer personalization system 214 may send historic communication data for the chosen customer from customer list 210 to data pre-processor 2. Communication data may include communication data for communications initiated by the customer or the organization.

Data pre-processor 2 may prepare communication data indicative of a customer interaction/message for submission to the machine learning models of DIVA engine 4. The machine learning models of DIVA indexer 10 may receive pre-processed communication data as input, and output a set of four emotion factor values indicative of the emotive content of the communication data. The set of emotion factor values may be stored in an emotion factor index database 22 along with a time stamp and associated with the communication data as well as the customer associated with the communication data. An emotion propensity model 220 may use one or more sets of emotion factor values associated with a customer from the emotion factor index database 22 as input, where the one or more sets of emotion factor values comprise at least the most recent set of emotion factor values. Emotion propensity model 220 may classify the customer into an emotional profile according to the customer's typical emotional response during customer communications. In some examples, emotion propensity model 220 may output an emotion propensity score (e.g., a number between zero and one) that can be mapped to an emotional profile. Emotion propensity model 220 may store data representing the customer's classification into a particular emotional profile in an emotional profiles database 414. When a new customer communication is received, emotion propensity model 220 may update the customer's emotional profile classification in emotional profiles database 414 as needed.

Emotional profiles database 414 may contain a plurality of emotional profiles, where each of the plurality of emotional profiles includes one or more customers with similar emotive responses to customer communications. The similar emotive responses may be represented by similar emotion factor value scores determined for communication data received from the customers. In some examples, an emotional profile may be a string category. For example, the different profiles could be titled "very averse to solicitation," "averse to solicitation," "ambivalent," "receptive to solicitation," or "very receptive to solicitation." In another example, the different profiles could reflect a dominant emotive trait in customer communications, like "aggressive," "inquisitive," "good-natured," or "headstrong." For each dominant emotive trait, the emotional profile could indicate how dominant that trait is, for example "generally inquisitive," or "very aggressive." In another example, the different emotional profiles may reflect a customer's emotive response to specific types of solicitation. For example, customers in a first emotional profile may respond positively to a specific service like overdraft protection, customers in a second emotional profile may respond positively to a cash-back rewards system, customers in a third emotional profile may respond positively to opening a new savings account, and customers in a fourth emotional profile may respond positively to loan offerings. In another example, an emotional profile may be a numeric category (e.g., one through ten), where customers in category one are the most receptive to solicitation and customers in category ten are the least receptive to solicitation.

Emotion propensity model 220 may output the emotional profile classification or the emotion propensity score to customer engagement system 222 to determine a probability that the customer will respond positively to customer engagement. In some examples, customer engagement system 222 may classify the customer in a solicitation list as more or less receptive to specific kinds of solicitation. In some examples, customer engagement system 222 may retrieve the emotional profile for a customer from emotional profiles database 414 when considering whether to solicit to the customer, or determining to which type of solicitation the customer may respond best. Customer engagement system 222 may receive a plurality of inputs related to the current customer. For example, input data may include the emotional profile for the customer, a number of previous solicitation efforts to the customer in a given time period, ratings from the customer for previous interactions, account information for the customer, and any other data helpful for an agent or automatic system to use in future solicitation of the customer. Based on input data, including the emotional profile or the emotion propensity score, customer engagement system 222 may determine a probability that the customer will respond positively to a particular type of customer engagement. In some examples, if customer engagement system 222 receives the emotion propensity score from emotion propensity model 220, customer engagement system 222 may map the emotion propensity score to the emotional profile.

By taking into account the emotive content of customer communications and a customer's typical emotive response, customer personalization system 214 may more accurately target customers for solicitation to provide more applicable services to each customer, and to be more successful in solicitation attempts.

Figure 3:
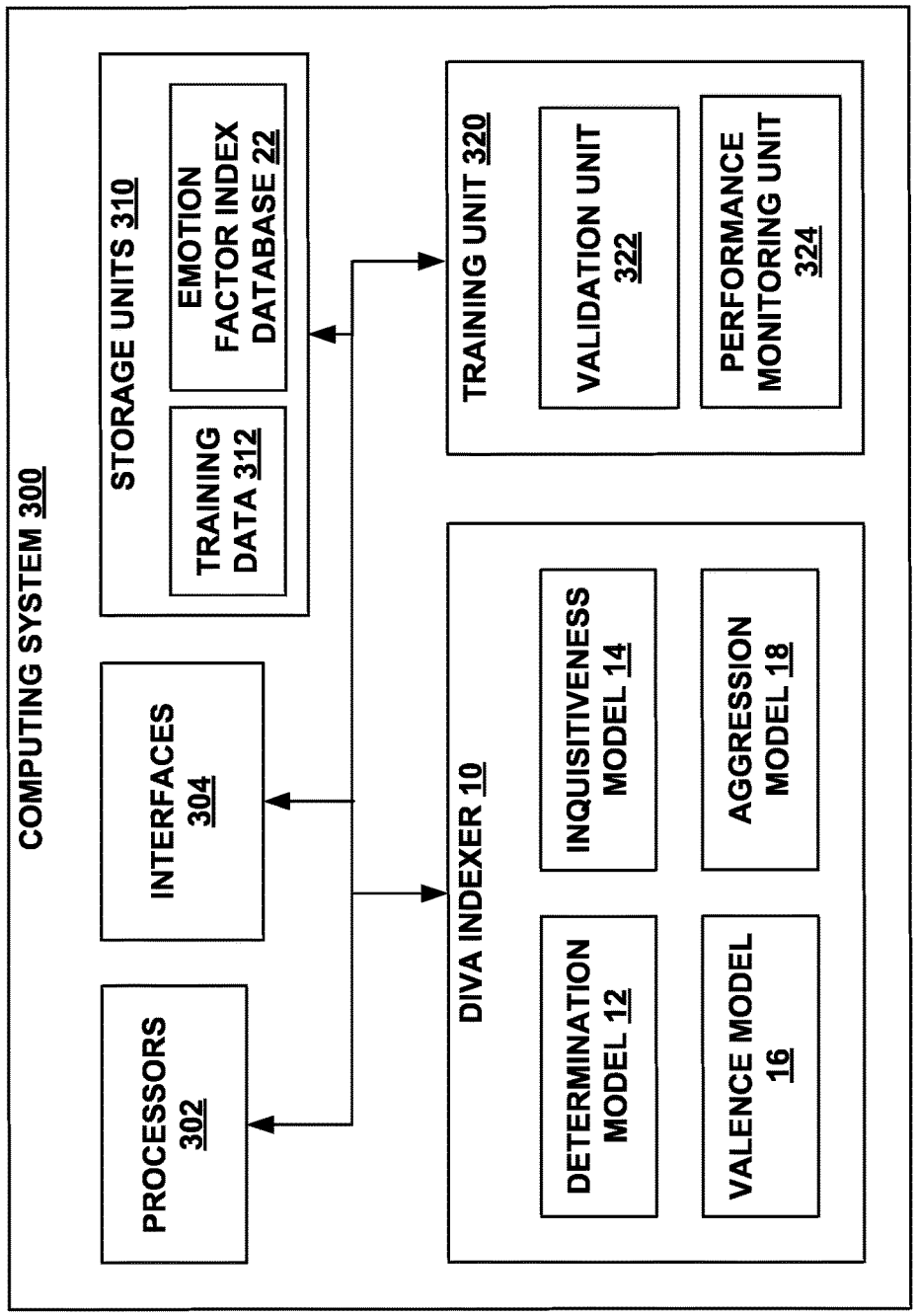
FIG. 3 is a block diagram illustrating an example computing system for running a DIVA indexer, in accordance with the techniques of this disclosure.

FIG. 3 is a block diagram illustrating an example computing system for running a DIVA indexer, in accordance with the techniques of this disclosure. The architecture of computing system 300 illustrated in FIG. 3 is shown for exemplary purposes only. Computing system 300 should not be limited to the illustrated example architecture. In other examples, computing system 300 may be configured in a variety of ways.

As shown in the example of FIG. 3, a computing system 300 includes one or more processors 302, one or more interfaces 304, and one or more storage units 310. The one or more storage units 310 may house training data 312, and an emotion factor index database 22. The computing system 300 also includes the DIVA indexer 10, and a training unit 320, which may be implemented as program instructions and/or data stored in the storage units 310 and executable by the processors 302. The DIVA indexer 10 may comprise a determination model 12, an inquisitiveness model 14, a valence model 16, and an aggression model 18.

Computing system 300 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 300 represents a cloud computing system, server farm, and/or server cluster (or portion thereof) that provides services to customer devices and other devices or systems. In other examples, computing system 300 may represent or be implemented through one or more virtualized compute instances (e.g., virtual machines, containers) of a data center, cloud computing system, server farm, and/or server cluster.

The storage units 310 of computing system 300 may also store an operating system (not shown) executable by the processors 302 to control the operation of components of the computing system 300. The components, units, or modules of the computing system 300 are coupled (physically, communicatively, and/or operatively) using communication channels for inter-component communications. In some examples, the communication channels may include a system bus, a network connection, an inter-process communication data structure, or any other method for communicating data.

The processors 302, in one example, may comprise one or more processors that are configured to implement functionality and/or process instructions for execution within the computing system 300. For example, processors 302 may be capable of processing instructions stored by storage units 310. Processors 302 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

The computing system 300 may utilize interfaces 304 to communicate with external systems via one or more networks, e.g., a customer service center. Interfaces 304 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, the computing system 300 utilizes interfaces 304 to wirelessly communicate with external systems, e.g., other computing devices or systems within customer personalization system 214 of FIG. 2.

Storage units 310 may be configured to store information within the computing system 300 during operation. Storage units 310 may include a computer-readable storage medium or computer-readable storage device. In some examples, storage units 310 include one or more of a short-term memory or a long-term memory. Storage units 310 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 310 are used to store program instructions for execution by processors 302. Storage units 310 may be used by software or applications running on the computing system 300 to temporarily store information during program execution.

Computing system 300 includes one or more machine learning models of DIVA indexer 10 and a training unit 320 used to train each of the machine learning models of DIVA indexer 10 using training data 312. As seen in FIG. 3, DIVA indexer 10 includes determination model 12, inquisitiveness model 14, valence model 16, and aggression model 18. The training unit 320 includes validation unit 322 and performance monitoring unit 324.

Machine learning algorithms or functions (e.g., a word embedding algorithm) are trained to create the machine learning models within DIVA indexer 10, configured to accept an input sequence of plain text data or text-based annotation data associated with a message and output, using determination model 12, inquisitiveness model 14, valence model 16, and aggression model 18, four emotion factor values including a determination value, an inquisitiveness value, a valence value, and an aggression value, where each value is an integer between −2 and 2 inclusive (although the integer range could consist of any range useful for the application) representing the intensity of the respective emotion contained within the message. For example, for each emotion factor value, −2 and −1 may be considered low values, while 1 and 2 may be considered high values. For example, a message could be scored with a determination value of negative one, a valence value of zero, an inquisitiveness value of two, and aggression value of two. The machine learning models within DIVA indexer 10 may generate emotion factor values based on text characteristics. For example, aggression model 18 may generate an aggression value of two for an incoming message if a set of text data associated with the incoming message has greater than a threshold level of similarity to known characteristics of messages with aggression values of two, as identified by aggression model 18.

Determination model 12 may be trained to determine a determination value based on input communication data representing a message. A machine learning model may be trained using a training process to create a data-specific model, such as determination model 12, based on training data 312. After the training process, the created model may be capable of determining an output data set based on an input data set (e.g., generate a determination value representing a level of determination emotion in a message based on communication data). The training process may implement a set of training data (e.g., training data 312) to create the model.

Determination model 12 may include functions configured to be executed by processors 302. In some examples, determination model 12 implements supervised learning, e.g., classifies sets of data into groups. For example, a set of data, such as communication data indicative of a message to a financial institution, may be classified with a determination value of negative two, negative one, zero, one, or two. In some examples, the function may include nodes, layers, and connections, and the function may be represented by equations having a plurality of variables and a plurality of known coefficients.

For example, determination model 12 may receive communication data in the form of plain-text or text-based annotation data and may parse the communication data to identify a sequence of items including any one or combination of words, phrases, characters (e.g., punctuation), and numerical values corresponding to a determination emotion and an intensity of the determination emotion. Determination model 12 may output a determination value comprised of an integer between −2 and 2 inclusive, where a higher number represents a higher determination emotion in the message. For example, a determination value of negative two may represent a lowest determination emotion within the message, a determination value of two may represent a highest determination emotion in the message, and a determination value of zero may represent a neutral determination emotion in the message. DIVA indexer 10 may store the determination value in an emotion factor index database 22 and assign an ID to the determination value to associate it with the message and the other emotion factor values generated for the message.

Training data 312 may include data indicative of a plurality of messages. At least some of the plurality of messages may represent customer complaints, responses, transcripts of calls or letters submitted to customer personalization system 214. The plurality of messages may include a group of messages with a determination value of negative two, a group of messages with a determination value of negative one, a group of messages with a determination value of zero, a group of messages with a determination value of one, and a group of messages with a determination value of two, where each message of the plurality of messages is known to have a determination value of negative two, negative one, zero, one, or two. In one example, training data 312 contains data representing about equal numbers of messages with determination values of each number negative two through two. In another example, training data 312 contains data including a greater number of messages with a determination value of two than messages with a determination value of zero. In another example, training data 312 contains data including a greater number of messages with a determination value of zero than messages with a determination value of two. Other examples are contemplated wherein training data 312 contains data including a greater number of messages with any particular determination value than a number of messages with any other particular determination value. Training unit 320 may access training data 312 stored in storage units 310, and training unit 320 may train determination model 12 using training data 312.

Validation unit 322 may be configured to determine an accuracy of determination model 12. For example, validation unit 322 may use determination model 12 to determine if an example message corresponding to a known determination value has a determination value of negative two, negative one, zero, one, or two. Validation unit 322 may determine if determination model 12 was able to correctly score the incoming message. Additionally, validation unit 322 may be configured to determine the accuracy of determination model 12 for a plurality of example messages each corresponding to a determination value, and validation unit 322 may be configured to identify an accuracy (e.g., a success rate) in which determination model 12 correctly scores the messages for each determination value. If the accuracy is above a threshold accuracy value, determination model 12 may be used to classify incoming messages to customer personalization system 214. If the accuracy is below the threshold accuracy value, training unit 320 may re-train determination model 12 based on an updated set of training data. In some examples, the threshold accuracy value in which determination model 12 may be used may be greater than or equal to 90%. In some examples, validation unit 322 may be configured to identify an accuracy in which determination model 12 correctly scores the determination values of a plurality of messages.

Training unit 320 may include performance monitoring unit 324. Performance monitoring unit 324 may monitor a performance of determination model 12 after it is applied to score incoming messages to customer personalization system 214 (e.g., score the four emotion factor values as integers between −2 and 2 inclusive). In some examples, performance monitoring unit 324 may determine an accuracy of determination model 12 by comparing determination values scored by determination model 12 with known determination values of a plurality of messages. For example, if determination model 12 determines that an incoming message has a determination value of negative one, and the incoming message is discovered to have a determination value of one, performance monitoring unit 324 may record that an incorrect determination value was generated. Performance monitoring unit 324 may continuously monitor an accuracy of determination model 12. Performance monitoring unit 324 may determine a fraction of messages in which determination model 12 correctly scores an incoming message. The fraction may represent a measured accuracy of determination model 12. New messages may be analyzed by performance monitoring unit 324, the new messages representing data that was not used by training unit 320 to create determination model 12. In other words, performance monitoring unit 324 may test the accuracy of determination model 12 continuously using new data. In some examples, if performance monitoring unit 324 determines that the accuracy of determination model 12 is below a threshold accuracy value (e.g., 90%), performance monitoring unit 324 may output an instruction to re-train determination model 12.

Training unit 320 may periodically (e.g., monthly, bi-monthly, yearly, or the like) re-train determination model 12 based on an updated set of training data. The updated set of training data may include part or all of the plurality of messages of training data 312. Additionally, the updated set of training data may include a set of messages that are received by customer personalization system 214 during a time since determination model 12 was last trained by training unit 320.

Inquisitiveness model 14 may be trained to determine an inquisitiveness value based on input communication data representing a message. A machine learning model may be trained using a training process to create a data-specific model, such as inquisitiveness model 14, based on training data 312. After the training process, the created model may be capable of determining an output data set based on an input data set (e.g., generate an inquisitiveness value representing a level of inquisitive emotion in a message based on communication data). The training process may implement a set of training data (e.g., training data 312) to create the model.

Inquisitiveness model 14 may include functions configured to be executed by processors 302. In some examples, inquisitiveness model 14 implements supervised learning, e.g., classifies sets of data into groups. For example, a set of data, such as communication data indicative of a message to a financial institution, may be classified with an inquisitiveness value of negative two, negative one, zero, one, or two. In some examples, the function may include nodes, layers, and connections, and the function may be represented by equations having a plurality of variables and a plurality of known coefficients.

For example, inquisitiveness model 14 may receive communication data in the form of plain-text or text-based annotation data and may parse the communication data to identify a sequence of items including any one or combination of words, phrases, characters (e.g., punctuation), and numerical values corresponding to an inquisitive emotion and an intensity of the inquisitive emotion. Inquisitiveness model 14 may output an inquisitiveness value comprised of an integer between −2 and 2 inclusive, where a higher number represents a higher inquisitive emotion in the message. For example, an inquisitiveness value of negative two may represent a lowest inquisitive emotion within the message, an inquisitiveness value of two may represent a highest inquisitive emotion in the message, and an inquisitiveness value of zero may represent a neutral inquisitive emotion in the message. DIVA indexer 10 may store the inquisitiveness value in an emotion factor index database 22 and assign an ID to the inquisitiveness value to associate it with the message and the other emotion factor values generated for the message.

Training data 312 may include data indicative of a plurality of messages. At least some of the plurality of messages may represent customer complaints, responses, transcripts of calls or letters submitted to customer personalization system 214. The plurality of messages may include a group of messages with a inquisitiveness value of negative 2, a group of messages with a inquisitiveness value of negative one, a group of messages with a inquisitiveness value of zero, a group of messages with a inquisitiveness value of one, and a group of messages with a inquisitiveness value of two, where each message of the plurality of messages is known to have an inquisitiveness value of negative two, negative one, zero, one, or two. In one example, training data 312 contains data representing about equal numbers of messages with inquisitiveness values of each number negative two through two. In another example, training data 312 contains data including a greater number of messages with an inquisitiveness value of two than messages with an inquisitiveness value of zero. In another example, training data 312 contains data including a greater number of messages with an inquisitiveness value of zero than messages with an inquisitiveness value of two. Other examples are contemplated wherein training data 312 contains data including a greater number of messages with any particular inquisitiveness value than a number of messages with any other particular inquisitiveness value. Training unit 320 may access training data 312 stored in storage units 310, and training unit 320 may train inquisitiveness model 14 using training data 312.

Validation unit 322 may be configured to determine an accuracy of inquisitiveness model 14. For example, validation unit 322 may use inquisitiveness model 14 to determine if an example message corresponding to a known inquisitiveness value has an inquisitiveness value of negative two, negative one, zero, one, or two. Validation unit 322 may determine if inquisitiveness model 14 was able to correctly score the incoming message. Additionally, validation unit 322 may be configured to determine the accuracy of inquisitiveness model 14 for a plurality of example messages each corresponding to an inquisitiveness value, and validation unit 322 may be configured to identify an accuracy (e.g., a success rate) in which inquisitiveness model 14 correctly scores the messages for each inquisitiveness value. If the accuracy is above a threshold accuracy value, inquisitiveness model 14 may be used to classify incoming messages to customer personalization system 214. If the accuracy is below the threshold accuracy value, training unit 320 may re-train inquisitiveness model 14 based on an updated set of training data. In some examples, the threshold accuracy value in which inquisitiveness model 14 may be used may be greater than or equal to 90%. In some examples, validation unit 322 may be configured to identify an accuracy in which inquisitiveness model 14 correctly scores the inquisitiveness values of a plurality of messages.

Training unit 320 may include performance monitoring unit 324. Performance monitoring unit 324 may monitor a performance of inquisitiveness model 14 after it is applied to score incoming messages to customer personalization system 214 (e.g., score the four emotion factor values as integers between −2 and 2 inclusive). In some examples, performance monitoring unit 324 may determine an accuracy of inquisitiveness model 14 by comparing inquisitiveness values scored by inquisitiveness model 14 with known inquisitiveness values of a plurality of messages. For example, if inquisitiveness model 14 determines that an incoming message has an inquisitiveness value of negative two, and the incoming message is discovered to have an inquisitiveness value of one, performance monitoring unit 324 may record that an incorrect inquisitiveness value was generated. Performance monitoring unit 324 may continuously monitor an accuracy of inquisitiveness model 14. Performance monitoring unit 324 may determine a fraction of messages in which inquisitiveness model 14 correctly scores an incoming message. The fraction may represent a measured accuracy of inquisitiveness model 14. New messages may be analyzed by performance monitoring unit 324, the new messages representing data that was not used by training unit 320 to create inquisitiveness model 14. In other words, performance monitoring unit 324 may test the accuracy of inquisitiveness model 14 continuously using new data. In some examples, if performance monitoring unit 324 determines that the accuracy of inquisitiveness model 14 is below a threshold accuracy value (e.g., 90%), performance monitoring unit 324 may output an instruction to re-train inquisitiveness model 14.

Training unit 320 may periodically (e.g., monthly, bi-monthly, yearly, or the like) re-train inquisitiveness model 14 based on an updated set of training data. The updated set of training data may include part or all of the plurality of messages of training data 312. Additionally, the updated set of training data may include a set of messages that are received by customer personalization system 214 during a time since inquisitiveness model 14 was last trained by training unit 320.

Valence model 16 may be trained to determine a valence value based on input communication data representing a message. A machine learning model may be trained using a training process to create a data-specific model, such as valence model 16, based on training data 312. After the training process, the created model may be capable of determining an output data set based on an input data set (e.g., generate a valence value representing a level of negative or positive emotion in a message based on communication data). The training process may implement a set of training data (e.g., training data 312) to create the model.

Valence model 16 may include functions configured to be executed by processors 302. In some examples, valence model 16 implements supervised learning, e.g., classifies sets of data into groups. For example, a set of data, such as communication data indicative of a message to a financial institution, may be classified with a valence value of negative two, negative one, zero, one, or two. In some examples, the function may include nodes, layers, and connections, and the function may be represented by equations having a plurality of variables and a plurality of known coefficients.

For example, valence model 16 may receive communication data in the form of plain-text or text-based annotation data and may parse the communication data to identify a sequence of items including any one or combination of words, phrases, characters (e.g., punctuation), and numerical values corresponding to a positive or negative emotion and an intensity of the emotion. Valence model 16 may output a valence value comprised of an integer between −2 and 2 inclusive, where a higher number represents a more positive emotion in the message. For example, a valence value of negative two may represent a very negative emotion within the message, a valence value of two may represent a very positive emotion in the message, and a valence value of zero may represent a neutral emotion in the message. DIVA indexer 10 may store the valence value in an emotion factor index database 22 and assign an ID to the valence value to associate it with the message and the other emotion factor values generated for the message.

Training data 312 may include data indicative of a plurality of messages. At least some of the plurality of messages may represent customer complaints, responses, transcripts of calls or letters submitted to customer personalization system 214. The plurality of messages may include a group of messages with a valence value of negative 2, a group of messages with a valence value of negative one, a group of messages with a valence value of zero, a group of messages with a valence value of one, and a group of messages with a valence value of two, where each message of the plurality of messages is known to have a valence value of negative two, negative one, zero, one, or two. In one example, training data 312 contains data representing about equal numbers of messages with valence values of each number negative two through two. In another example, training data 312 contains data including a greater number of messages with a valence value of two than messages with a valence value of zero. In another example, training data 312 contains data including a greater number of messages with a valence value of zero than messages with a valence value of two. Other examples are contemplated wherein training data 312 contains data including a greater number of messages with any particular valence value than a number of messages with any other particular valence value. Training unit 320 may access training data 312 stored in storage units 310, and training unit 320 may train valence model 16 using training data 312.

Validation unit 322 may be configured to determine an accuracy of valence model 16. For example, validation unit 322 may use valence model 16 to determine if an example message corresponding to a known valence value has a valence value of negative two, negative one, zero, one, or two. Validation unit 322 may determine if valence model 16 was able to correctly score the incoming message. Additionally, validation unit 322 may be configured to determine the accuracy of valence model 16 for a plurality of example messages each corresponding to a valence value, and validation unit 322 may be configured to identify an accuracy (e.g., a success rate) in which valence model 16 correctly scores the messages for each valence value. If the accuracy is above a threshold accuracy value, valence model 16 may be used to classify incoming messages to customer personalization system 214. If the accuracy is below the threshold accuracy value, training unit 320 may re-train valence model 16 based on an updated set of training data. In some examples, the threshold accuracy value in which valence model 16 may be used may be greater than or equal to 90%. In some examples, validation unit 322 may be configured to identify an accuracy in which valence model 16 correctly scores the valence values of a plurality of messages.

Training unit 320 may include performance monitoring unit 324. Performance monitoring unit 324 may monitor a performance of valence model 16 after it is applied to score incoming messages to customer personalization system 214 (e.g., score the four emotion factor values as integers between −2 and 2 inclusive). In some examples, performance monitoring unit 324 may determine an accuracy of valence model 16 by comparing valence values scored by valence model 16 with known valence values of a plurality of messages. For example, if valence model 16 determines that an incoming message has a valence value of negative two, and the incoming message is discovered to have a valence value of one, performance monitoring unit 324 may record that an incorrect valence value was generated. Performance monitoring unit 324 may continuously monitor an accuracy of valence model 16. Performance monitoring unit 324 may determine a fraction of messages in which valence model 16 correctly scores an incoming message. The fraction may represent a measured accuracy of valence model 16. New messages may be analyzed by performance monitoring unit 324, the new messages representing data that was not used by training unit 320 to create valence model 16. In other words, performance monitoring unit 324 may test the accuracy of valence model 16 continuously using new data. In some examples, if performance monitoring unit 324 determines that the accuracy of valence model 16 is below a threshold accuracy value (e.g., 90%), performance monitoring unit 324 may output an instruction to re-train valence model 16.

Training unit 320 may periodically (e.g., monthly, bi-monthly, yearly, or the like) re-train valence model 16 based on an updated set of training data. The updated set of training data may include part or all of the plurality of messages of training data 312. Additionally, the updated set of training data may include a set of messages that are received by customer personalization system 214 during a time since valence model 16 was last trained by training unit 320.

Aggression model 18 may be trained to determine an aggression value based on input communication data representing a message. A machine learning model may be trained using a training process to create a data-specific model, such as aggression model 18, based on training data 312. After the training process, the created model may be capable of determining an output data set based on an input data set (e.g., generate an aggression value representing a level of aggressive emotion in a message based on communication data). The training process may implement a set of training data (e.g., training data 312) to create the model.

Aggression model 18 may include functions configured to be executed by processors 302. In some examples, aggression model 18 implements supervised learning, e.g., classifies sets of data into groups. For example, a set of data, such as communication data indicative of a message to a financial institution, may be classified with an aggression value of negative two, negative one, zero, one, or two. In some examples, the function may include nodes, layers, and connections, and the function may be represented by equations having a plurality of variables and a plurality of known coefficients.

For example, aggression model 18 may receive communication data in the form of plain-text or text-based annotation data and may parse the communication data to identify a sequence of items including any one or combination of words, phrases, characters (e.g., punctuation), and numerical values corresponding to an aggressive emotion and an intensity of the aggressive emotion. Aggression model 18 may output an aggression value comprised of an integer between −2 and 2 inclusive, where a higher number represents a higher aggressive emotion in the message. For example, an aggression value of negative two may represent a lowest aggressive emotion within the message, an aggression value of two may represent a highest aggressive emotion in the message, and an aggression value of zero may represent a neutral aggressive emotion in the message. DIVA indexer 10 may store the aggression value in an emotion factor index database 22 and assign an ID to the aggression value to associate it with the message and the other emotion factor values generated for the message.

Training data 312 may include data indicative of a plurality of messages. At least some of the plurality of messages may represent customer complaints, responses, transcripts of calls or letters submitted to customer personalization system 214. The plurality of messages may include a group of messages with a aggression value of negative 2, a group of messages with a aggression value of negative one, a group of messages with a aggression value of zero, a group of messages with a aggression value of one, and a group of messages with a aggression value of two, where each message of the plurality of messages is known to have an aggression value of negative two, negative one, zero, one, or two. In one example, training data 312 contains data representing about equal numbers of messages with aggression values of each number negative two through two. In another example, training data 312 contains data including a greater number of messages with an aggression value of two than messages with an aggression value of zero. In another example, training data 312 contains data including a greater number of messages with an aggression value of zero than messages with an aggression value of two. Other examples are contemplated wherein training data 312 contains data including a greater number of messages with any particular aggression value than a number of messages with any other particular aggression value. Training unit 320 may access training data 312 stored in storage units 310, and training unit 320 may train aggression model 18 using training data 312.

Validation unit 322 may be configured to determine an accuracy of aggression model 18. For example, validation unit 322 may use aggression model 18 to determine if an example message corresponding to a known aggression value has an aggression value of negative two, negative one, zero, one, or two. Validation unit 322 may determine if aggression model 18 was able to correctly score the incoming message. Additionally, validation unit 322 may be configured to determine the accuracy of aggression model 18 for a plurality of example messages each corresponding to an aggression value, and validation unit 322 may be configured to identify an accuracy (e.g., a success rate) in which aggression model 18 correctly scores the messages for each aggression value. If the accuracy is above a threshold accuracy value, aggression model 18 may be used to classify incoming messages to customer personalization system 214. If the accuracy is below the threshold accuracy value, training unit 320 may re-train aggression model 18 based on an updated set of training data. In some examples, the threshold accuracy value in which aggression model 18 may be used may be greater than or equal to 90%. In some examples, validation unit 322 may be configured to identify an accuracy in which aggression model 18 correctly scores the aggression values of a plurality of messages.

Training unit 320 may include performance monitoring unit 324. Performance monitoring unit 324 may monitor a performance of aggression model 18 after it is applied to score incoming messages to customer personalization system 214 (e.g., score the four emotion factor values as integers between −2 and 2 inclusive). In some examples, performance monitoring unit 324 may determine an accuracy of aggression model 18 by comparing aggression values scored by aggression model 18 with known aggression values of a plurality of messages. For example, if aggression model 18 determines that an incoming message has an aggression value of negative two, and the incoming message is discovered to have an aggression value of one, performance monitoring unit 324 may record that an incorrect aggression value was generated. Performance monitoring unit 324 may continuously monitor an accuracy of aggression model 18. Performance monitoring unit 324 may determine a fraction of messages in which aggression model 18 correctly scores an incoming message. The fraction may represent a measured accuracy of aggression model 18. New messages may be analyzed by performance monitoring unit 324, the new messages representing data that was not used by training unit 320 to create aggression model 18. In other words, performance monitoring unit 324 may test the accuracy of aggression model 18 continuously using new data. In some examples, if performance monitoring unit 324 determines that the accuracy of aggression model 18 is below a threshold accuracy value (e.g., 90%), performance monitoring unit 324 may output an instruction to re-train aggression model 18.

Training unit 320 may periodically (e.g., monthly, bi-monthly, yearly, or the like) re-train aggression model 18 based on an updated set of training data. The updated set of training data may include part or all of the plurality of messages of training data 312. Additionally, the updated set of training data may include a set of messages that are received by customer personalization system 214 during a time since aggression model 18 was last trained by training unit 320.

Computing system 300 may receive communication data from a customer and input the plain text data to DIVA indexer 10. The machine learning models 12, 14, 16, and 18 of DIVA indexer 10 output the four emotion factor values and store the emotion factor values in emotion factor index database 22 as associated with the communication from the customer. Computing system 300 may then send the emotion factor values and a group of historic emotion factor values associated with historic communications from the customer, e.g., using interfaces 304, to another computing system executing an emotion propensity model 220 configured to classify the customer into an emotional profile according to the customer's typical emotional response during customer communications based on the emotion factor values and group of historic emotion factor values.

Figure 4:
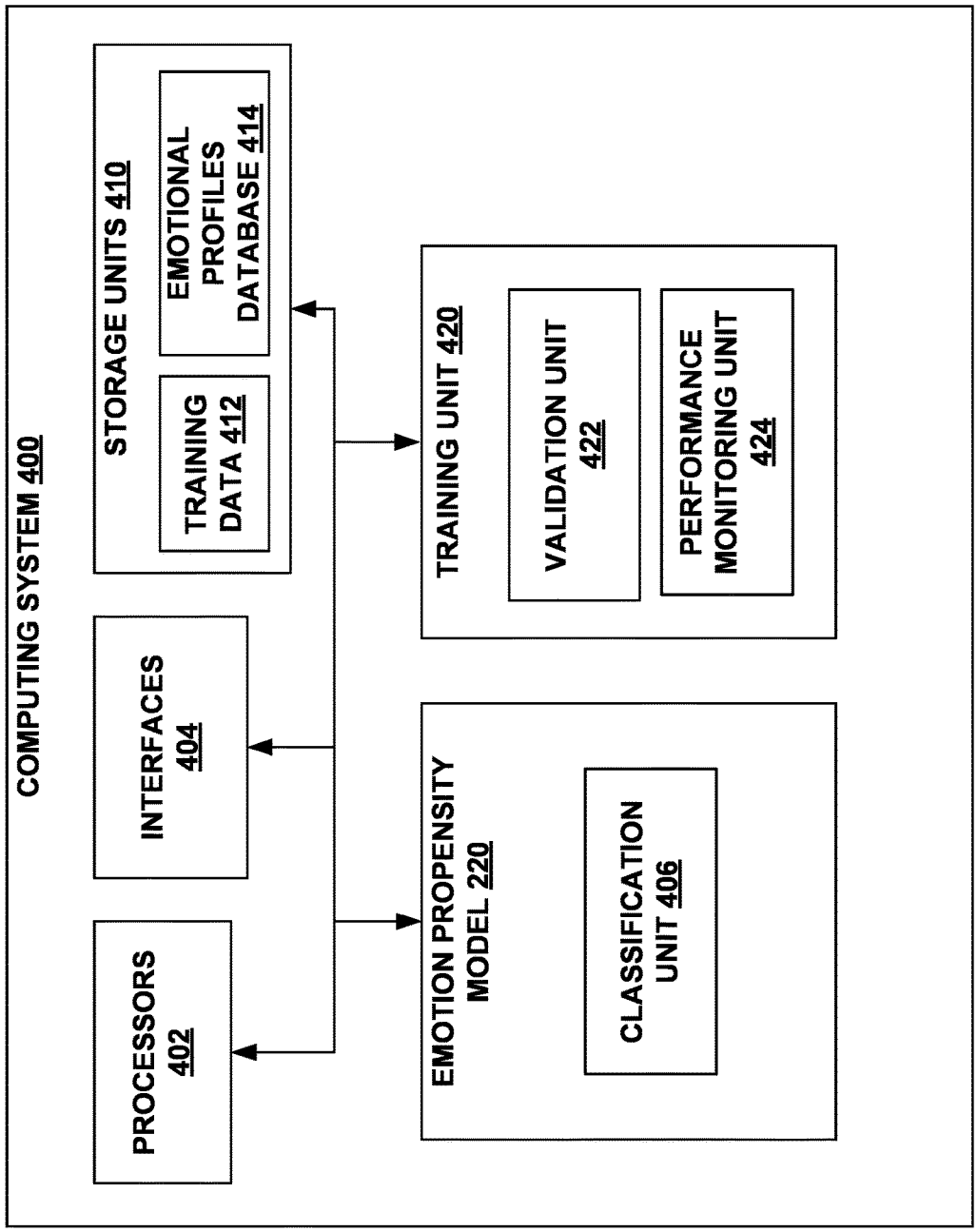
FIG. 4 is a block diagram illustrating an example computing system for running an emotion propensity model, in accordance with the techniques of this disclosure.

FIG. 4 is a block diagram illustrating an example computing system for running an emotion propensity model, in accordance with the techniques of this disclosure. The architecture of computing system 400 illustrated in FIG. 4 is shown for exemplary purposes only. Computing system 400 should not be limited to the illustrated example architecture. In other examples, computing system 400 may be configured in a variety of ways. Although computing system 300 and computing system 400 are illustrated herein as separate systems, in other examples DIVA indexer 10 and emotion propensity model 220 may be run on a single, shared computing system.

Computing system 400 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 400 represents a cloud computing system, server farm, and/or server cluster (or portion thereof) that provides services to customer devices and other devices or systems. In other examples, computing system 400 may represent or be implemented through one or more virtualized compute instances (e.g., virtual machines, containers) of a data center, cloud computing system, server farm, and/or server cluster.

As shown in the example of FIG. 4, a computing system 400 includes one or more processors 402, one or more interfaces 404, and one or more storage units 410. The one or more storage units 410 may house training data 412, and/or emotional profiles database 414. The computing system 400 also includes the emotion propensity model 220, and a training unit 420, which may be implemented as program instructions and/or data stored in the storage units 410 and executable by the processors 402.

The storage units 410 of the computing system 400 may also store an operating system (not shown) executable by the processors 402 to control the operation of components of the computing system 400. The components, units, or modules of the computing system 400 are coupled (physically, communicatively, and/or operatively) using communication channels for inter-component communications. In some examples, the communication channels may include a system bus, a network connection, an inter-process communication data structure, or any other method for communicating data.

The processors 402, in one example, may comprise one or more processors that are configured to implement functionality and/or process instructions for execution within the computing system 400. For example, processors 402 may be capable of processing instructions stored by storage units 410. Processors 402 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

The computing system 400 may utilize interfaces 404 to communicate with external systems via one or more networks, e.g., a customer service center. Interfaces 404 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, the computing system 400 utilizes interfaces 404 to wirelessly communicate with external systems, e.g., other computing devices or systems within customer personalization system 214 of FIG. 2.

Storage units 410 may be configured to store information within the computing system 400 during operation. Storage units 410 may include a computer-readable storage medium or computer-readable storage device. In some examples, storage units 410 include one or more of a short-term memory or a long-term memory. Storage units 410 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 410 are used to store program instructions for execution by processors 402. Storage units 410 may be used by software or applications running on the computing system 400 to temporarily store information during program execution.

Computing system 400 includes a machine learning emotion propensity model 220 with a classification unit 406. Computing system 400 also includes a training unit 420. As seen in FIG. 4, training unit 420 includes validation unit 422 and performance monitoring unit 424.

The emotion propensity model 220 may be configured to classify a customer into an emotional profile according to the customer's typical emotional response during customer communications based on one or more sets of emotion factor values for the communication data associated with the customer over time. Computing system 400 may retrieve, e.g., using interfaces 404, the emotion factor values associated with a customer's communications from emotion factor index database 22. Emotion propensity model 220 may receive one or more sets of the emotion factor values as input and classify the customer into an emotional profile based on the one or more sets of emotion factor values. The emotional profile for the customer may be stored in emotional profiles database 414 and associated with the customer. For a given customer communication, emotion propensity model 220 may accept emotion factor values for the given customer communication having a first timestamp as input, as well as historic emotion factor values for previous customer communications having timestamps earlier than the first timestamp that are associated with the same customer and stored in emotional profiles database 414. In this way, emotion propensity model 220 may take into account the emotive content of past customer communications for a given customer when classifying a customer into an emotional profile based on the most recent service inquiry submitted by the same customer.

In another example, the emotion propensity model 220 may be configured to determine an emotion propensity score for a customer quantifying the customer's preference for a particular type of customer engagement based on one or more sets of emotion factor values for communication data regarding that particular type of customer engagement and where the one or more sets of emotion factor values are associated with the customer over time. Computing system 400 may retrieve, e.g., using interfaces 404, the emotion factor values associated with a customer's communications from emotion factor index database 22. Emotion propensity model 220 may receive one or more sets of the emotion factor values as input and output an emotion propensity score (e.g., a number between zero and one, inclusive) based on the one or more sets of emotion factor values. The emotion propensity score may be mapped to an emotional profile, where each emotional profile of a plurality of emotional profiles in emotional profiles database 414 is associated with one or more emotion propensity scores. The emotion propensity score for the customer may be stored in emotional profiles database 414 and associated with the customer. For a given customer communication, emotion propensity model 220 may accept emotion factor values for that customer communication as input, as well as historic emotion factor values associated with the same customer for customer communications regarding the same particular type of customer engagement, where the historic emotion factor values are stored in emotion factor index database 22. In this way, emotion propensity model 220 may take into account the emotive content of past customer communications for a given customer when determining an emotion propensity score for a customer based on the most recent customer communication from the same customer.

Emotion propensity model 220 may include functions configured to be executed by processors 402. In some examples, emotion propensity model 220 implements supervised learning, e.g., classifies sets of data into groups. For example, emotion propensity model 220 may use a set of data, such as a set of one or more emotion factor values indicative of the emotion content in a customer communication, to classify the customer who engaged in the communication into an emotional profile indicative of the customer's typical emotional response during customer communications. In another example, emotion propensity model 220 may use a set of data, such as a set of one or more emotion factor values indicative of the emotion content in a customer communication regarding a specific type of customer engagement, to generate a propensity score that quantifies the customer's preference for that particular type of customer engagement. In some examples, the function may include nodes, layers, and connections, and the function may be represented by equations having a plurality of variables and a plurality of known coefficients.

Machine learning algorithms, such as emotion propensity model 220, may be trained using a training process to create data-specific models, such as emotion propensity model 220 based on training data 412. After the training process, the created model may be capable of determining an output data set based on an input data set (e.g., classify a customer into an emotional profile based on a set of one or more emotion factor values, generate an emotion propensity score associated based on a set of one or more emotion factor values). The training process may implement a set of training data (e.g., training data 412) to create the model.

Training data 412 may include data indicative of a plurality of sets of emotion factor values. At least some of the plurality of sets of emotion factor values may represent the emotive content of customer communications submitted to computing system 400.

In one example, the plurality of sets of emotion factor values may include a group of sets of emotion factor values labeled with a first emotional profile, a group of sets of emotion factor values labeled with a second emotional profile, and so on for each emotional profile of a plurality of emotional profiles, where each group of sets of emotion factor values of the plurality of sets of emotion factor values is known to have a particular emotional profile label. In some examples, training data 412 contains data representing about equal numbers of sets of emotion factor values labeled with each emotional profile of the plurality of emotional profiles. In another example, training data 412 contains data including a greater number of sets of emotion factor values labeled with a first emotional profile than a number of sets of emotion factor values labeled with a second emotional profile. Other examples are contemplated wherein training data 412 contains data including a greater number of sets of emotion factor values labeled with any particular emotional profile than a number of sets of emotion factor values labeled with any other particular emotional profile.

In another example, the plurality of sets of emotion factor values may include a group of sets of emotion factor values labeled with a first emotion propensity score, a group of sets of emotion factor values labeled with a second emotion propensity score, and so on for each emotion propensity score of a plurality of emotion propensity scores, where each group of sets of emotion factor values of the plurality of sets of emotion factor values is known to have a particular emotion propensity score label. In some examples, training data 412 contains data representing about equal numbers of sets of emotion factor values labeled with each emotion propensity score of the plurality of emotion propensity scores. In another example, training data 412 contains data including a greater number of sets of emotion factor values labeled with a first emotion propensity score than a number of sets of emotion factor values labeled with a second emotion propensity score. Other examples are contemplated wherein training data 412 contains data including a greater number of sets of emotion factor values labeled with any particular emotion propensity score than a number of sets of emotion factor values labeled with any other particular emotion propensity score. Training unit 420 may access training data 412 stored in storage units 410, and training unit 420 may train the emotion propensity model 220 using training data 412.

In one example, a machine learning algorithm or function (e.g., a word embedding algorithm) is trained to create the emotion propensity model 220 configured to accept an input set or sets of emotion factor values associated with customer communications for a particular customer and output, using classification unit 406, an emotional profile classification for the customer representing the customer's typical emotive response during customer communications over time. For example, emotion propensity model 220 may output classifications based on mapped patterns of emotion factor values. For example, emotion propensity model 220 may classify a customer into an "aggressive" emotional profile based on a series of customer communications if one or more sets of emotion factor values associated with the customer communications have greater than a threshold level of similarity to known characteristics of sets of emotion factor values classified in an "aggressive" emotional profile, as identified by classification unit 406 with reference to emotional profiles database 414. Training unit 420 may output emotional profiles to storage units 410.

In another example, a machine learning algorithm or function (e.g., a word embedding algorithm) is trained to create the emotion propensity model 220 configured to accept an input set or sets of emotion factor values associated with customer communications regarding a particular type of customer engagement for a particular customer, and output an emotion propensity score for the customer that quantifies the customer's preference for the particular type of customer engagement over time. For example, emotion propensity model 220 may output emotion propensity scores based on mapped patterns of emotion factor values. For example, emotion propensity model 220 may output an emotion propensity score of 0.7 based on a series of customer communications if one or more sets of emotion factor values associated with the customer communications have greater than a threshold level of similarity to known characteristics of sets of emotion factor values with emotion propensity scores of 0.7. Training unit 420 may output emotion propensity scores to storage units 410.

Validation unit 422 may be configured to determine an accuracy of emotion propensity model 220.

In one example, validation unit 422 may use emotion propensity model 220 to determine if example sets of emotion factor values for customer communications correspond to a known emotional profile classification. Validation unit 422 may determine if emotion propensity model 220 is able to correctly classify the set of emotion factor values. Additionally, validation unit 422 may be configured to determine the accuracy of emotion propensity model 220 for a plurality of example emotional profile classifications each corresponding to one or more sets of emotion factor values associated with customer communications, and validation unit 422 may be configured to identify an accuracy (e.g., a success rate) in which emotion propensity model 220 correctly classifies the one or more sets of emotion factor values for each emotional profile. If the accuracy is above a threshold accuracy value, emotion propensity model 220 may be used to classify sets of emotion factor values output by DIVA indexer 10. If the accuracy is below the threshold accuracy value, training unit 420 may re-train emotion propensity model 220 based on an updated set of training data. In some examples, the threshold accuracy value in which emotion propensity model 220 may be used may be greater than or equal to 90%. In some examples, validation unit 422 may be configured to identify an accuracy in which emotion propensity model 220 correctly classifies a plurality of sets of emotion factor values into emotional profiles.

In another example, validation unit 422 may use emotion propensity model 220 to determine if an example set of emotion factor values for a service inquiry correspond to a known emotional propensity score. Validation unit 422 may determine if emotion propensity model 220 is able to correctly score the set of emotion factor values. Additionally, validation unit 422 may be configured to determine the accuracy of emotion propensity model 220 for a plurality of example emotional propensity scores each corresponding to one or more sets of emotion factor values associated with customer communications, and validation unit 422 may be configured to identify an accuracy (e.g., a success rate) in which emotion propensity model 220 correctly scores the set of emotion factor values for each emotional propensity score. If the accuracy is above a threshold accuracy value, emotion propensity model 220 may be used to score sets of emotion factor values output by DIVA indexer 10. If the accuracy is below the threshold accuracy value, training unit 420 may re-train emotion propensity model 220 based on an updated set of training data. In some examples, the threshold accuracy value in which emotion propensity model 220 may be used may be greater than or equal to 90%. In some examples, validation unit 422 may be configured to identify an accuracy in which emotion propensity model 220 correctly scores the emotional propensity scores of a plurality of sets of emotion factor values.

Training unit 420 may include performance monitoring unit 424. Performance monitoring unit 424 may monitor a performance of emotion propensity model 220 after it is applied to score sets of emotion factor values output by DIVA indexer 10.

In some examples, performance monitoring unit 424 may determine an accuracy of emotion propensity model 220 by comparing emotional profile classifications generated by emotion propensity model 220 with known emotional profile classifications of a plurality of sets of emotion factor values. For example, if emotion propensity model 220 classifies an incoming set of emotion factor values into an emotional profile of "very averse to solicitation," and the set of emotion factor values is discovered to have a classification of "ambivalent to solicitation," performance monitoring unit 424 may record that an customer was classified into an incorrect emotional profile. Performance monitoring unit 424 may continuously monitor an accuracy of emotion propensity model 220. Performance monitoring unit 424 may determine a fraction of sets of emotion factor values in which emotion propensity model 220 correctly classifies a customer into an emotional profile. The fraction may represent a measured accuracy of the model. New sets of emotion factor values may be analyzed by performance monitoring unit 424, the new sets of emotion factor values representing data that was not used by training unit 420 to create the model. In other words, performance monitoring unit 424 may test the accuracy of the model continuously using new data. In some examples, if performance monitoring unit 424 determines that the accuracy of emotion propensity model 220 is below a threshold accuracy value (e.g., 90%), performance monitoring unit 424 may output an instruction to re-train emotion propensity model 220.

In other examples, performance monitoring unit 424 may determine an accuracy of emotion propensity model 220 by comparing emotional propensity scores generated by emotion propensity model 220 with known emotional propensity scores of a plurality of sets of emotion factor values. For example, if emotion propensity model 220 determines that an incoming set of emotion factor values has an emotional propensity score of 0.3, and the set of emotion factor values is discovered to have an emotional propensity score of 0.6, performance monitoring unit 424 may record that an incorrect emotional propensity score was generated. Performance monitoring unit 424 may continuously monitor an accuracy of emotion propensity model 220. Performance monitoring unit 424 may determine a fraction of sets of emotion factor values in which emotion propensity model 220 correctly outputs an emotional propensity score. The fraction may represent a measured accuracy of the model. New sets of emotion factor values may be analyzed by performance monitoring unit 424, the new sets of emotion factor values representing data that was not used by training unit 420 to create the model. In other words, performance monitoring unit 424 may test the accuracy of the model continuously using new data. In some examples, if performance monitoring unit 424 determines that the accuracy of emotion propensity model 220 is below a threshold accuracy value (e.g., 90%), performance monitoring unit 424 may output an instruction to re-train emotion propensity model 220.

Training unit 420 may periodically (e.g., monthly, bi-monthly, yearly, or the like) re-train emotion propensity model 220 based on an updated set of training data. The updated set of training data may include part or all of the plurality of sets of emotion factor values of training data 412. Additionally, the updated set of training data may include a plurality of sets of emotion factor values that are received by customer personalization system 214 during a time since emotion propensity model 220 was last trained by training unit 420.

Computing system 400 may retrieve one or more sets of emotion factor values for customer communications of a customer over time as input to emotion propensity model 220. In some examples, the customer communications are all in reference to the same type of customer engagement. In some examples, emotion propensity model 220 may classify the customer into an emotional profile based on the one or more sets of emotion factor values. In other examples, the emotion propensity model 220 may output an emotional propensity score for the customer. Customer engagement system 222 may receive the emotional profile or emotional propensity score for the customer as one of a plurality of inputs to assign determine a likelihood that a customer will respond positively to a particular type of customer engagement. Agents may decide to solicit specific or general products or services to customers based on the determined likelihood that those customers will respond positively to the solicitation. Customer engagement system 222 may also generate a recommended communication style for the next communication with the customer, for example customer engagement system 222 may recommend being extremely polite to a customer classified in an emotional profile for high-strung individuals who are easily offended, or customer engagement system 222 may recommend being very encouraging and patient with someone classified in an emotional profile for generally sad individuals. In another example, customer engagement system 222 may recommend putting customers classified in an emotional profile for angry and aggressive individuals on hold for extended periods so they have time to cool off.

Figure 5:
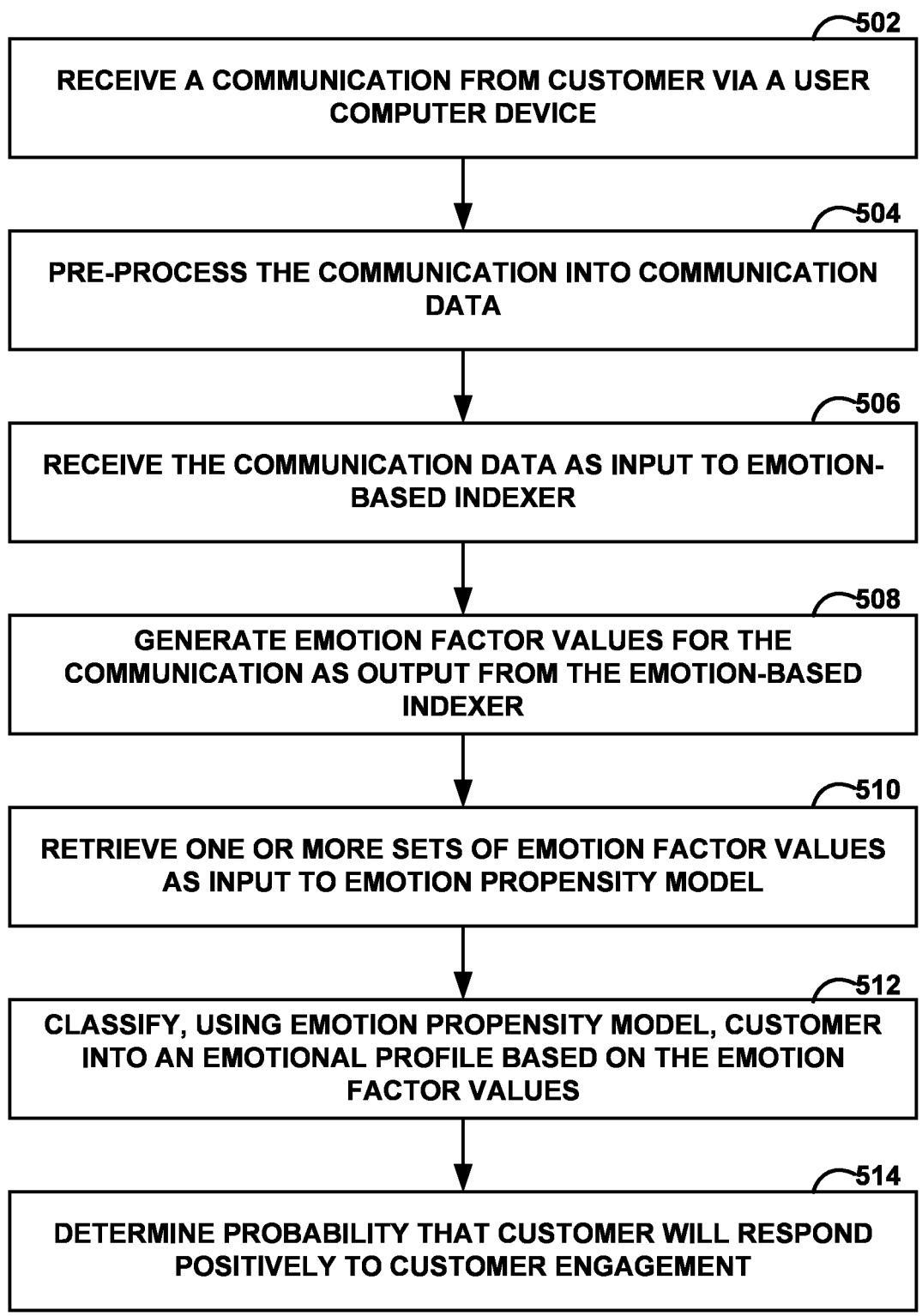
FIG. 5 is a flow diagram illustrating an example process for determining a probability that a customer will react positively to customer engagement, in accordance with the techniques of this disclosure.

FIG. 5 is a flow diagram illustrating an example process for determining a probability that a customer will react positively to customer engagement, in accordance with the techniques of this disclosure. The example process of FIG. 5 may be performed by customer personalization system 214 of FIG. 2, including DIVA indexer 10, e.g., running on computing system 300 of FIG. 3, emotion propensity model 220, e.g., running on computing system 400 of FIG. 4, and customer engagement system 222.

Customer personalization system 214 associated with an organization or business receives customer data representing a customer communication from a customer that can be used to determine a probability that the customer will react positively to customer engagement or solicitation efforts (502). The customer may send the communication from user device 206 to one or more servers or other computing devices of customer personalization system 214. The customer communication may be in the form of a text, call, letter, email, or other form of communication.

Once customer personalization system 214 receives the customer communication, data pre-processor 2 may pre-process the communication into communication data for further processing (504). The communication data may be in plain text format, where data pre-processor 2 digitally transcribes audio messages into plain text format, or an employee of the organization manually transcribes the audio message into plain text format. In some examples, data pre-processor 2 transcribes visual data (from scanned documents, pdf files, image files etc.) into plain text format, or an employee of the organization manually transcribes visual data into plain text format. Data pre-processor 2 may include a speech recognition model, e.g., a natural language processing (NLP) engine, configured to convert audio customer service inquiries to plain text data via natural language processing. In other examples, data pre-processor 2 may include a text image recognition model configured to convert hand- or typewritten customer service inquiries to plain text data or text-based annotation data.

DIVA indexer 10 then receives the processed communication data as input to the machine learning algorithms within DIVA indexer 10 (506). DIVA indexer 10 comprises multiple machine learning models, including a determination model 12, inquisitiveness model 14, valence model 16, and aggression model 18. The machine learning models within DIVA indexer 10 may accept plain text or text-based annotation data as input, where the communication data received is associated with a single communication submitted by the customer.

DIVA indexer 10 generates a set of emotion factor values, where each of the machine learning models within DIVA indexer 10 is configured to generate a single emotion factor value as output (508). Each of the emotion factor values may be indicative of an emotive intensity present in the communication data. For example, determination model 12 may generate a determination value comprising an integer between −2 and 2 (inclusive). A determination value of −2 may indicate that the customer communication conveys a low determination, where the customer may feel undecided on an issue. A determination value of 2 may indicate that the customer communication conveys a high determination value, where the customer may feel fixated on an issue. Similarly, inquisitiveness model 14 may generate an inquisitiveness value, valence model 16 may generate a valence value, and aggression model 18 may generate an aggression value, where each emotion factor value may be an integer between −2 and 2 (inclusive), representing the intensity of the respective emotion as conveyed in the customer communication. The four emotion factor values may be saved in an emotion factor index database 22 as associated with the communication data and the customer who sent the customer communication.

Emotion propensity model 220 then retrieves one or more sets of emotion factor values associated with the customer from the emotion factor index database 22, or may receive the one or more sets of emotion factor values from DIVA indexer 10 as input (510). Emotion propensity model 220 may be a machine learning model or a business rule-based model.

Emotion propensity model 220 then classifies the customer into an emotional profile based on the one or more sets of emotion factor values (512). In some examples emotion propensity model 220 is a machine learning model, trained as described below to classify a customer into an emotional profile according to the customer's typical emotional response during customer communications. In some examples emotion propensity model 220 is a machine learning model, trained as described below to generate an emotion propensity score quantifying the customer's preference for a particular type of customer engagement, where customer engagement system 222 can map the propensity score to an emotional profile for that particular type of customer engagement.

The emotional profile may represent a category of individuals who all react similarly to customer engagement efforts based on the emotive content of their communications with an organization or business. For example, multiple different customers may send communications to customer personalization system 214, and DIVA indexer 10 may determine congruent sets of emotion factor values for each communication. Both customers may be classified into the same emotional profile. In other examples, although DIVA indexer 10 determines that two different communications from two different customers each have different emotion factor values, emotion propensity model 220 may classify both customers into the same emotional profile indicating that both customers are likely to respond to solicitation in a similar manner. In some examples, an emotional profile may be a string category. For example, the different profiles could be titled "very averse to solicitation," "averse to solicitation," "ambivalent," "receptive to solicitation," or "very receptive to solicitation." In another example, the different profiles could reflect a dominant emotive trait in customer communications, like "aggressive," "inquisitive," "good-natured," or "headstrong." For each dominant emotive trait, the emotional profile could indicate how dominant that trait is, for example "generally inquisitive," or "very aggressive." In another example, the different emotional profiles may reflect a customer's emotive response to specific types of solicitation. For example, customers in a first emotional profile may respond positively to a specific service like overdraft protection, customers in a second emotional profile may respond positively to a cash-back rewards system, customers in a third emotional profile may respond positively to opening a new savings account, and customers in a fourth emotional profile may respond positively to loan offerings. In another example, an emotional profile may be a numeric category (e.g., one through ten, zero through one), where customers in category one are the most receptive to solicitation and customers in category ten are the least receptive to solicitation. Emotion propensity model 220 may store the emotional profiles in an emotional profiles database 414 as associated with a customer, and one or more sets of emotion factor values.

The emotional propensity score may be a numerical value (e.g., a number between zero and one inclusive), where different numerical values may be associated with different emotional profiles. In some examples, a consecutive series of emotional propensity scores may be associated with a single emotional profile, for example 0.01 through 0.10 may be associated with a first emotional profile and 0.11 through 0.20 may be associated with a second emotional profile. Emotion propensity model 220 may store the emotional propensity score in an emotional profiles database 414 as associated with a customer, one or more sets of emotion factor values, and an emotional profile.

In some examples, emotion propensity model 220 is a business rule-based model for classifying a customer into an emotional profile by calculating a composite score from emotion factor values associated with that customer's communications. For example, emotion propensity model may determine a composite score by calculating an average determination score, inquisitiveness score, valence score, and aggression score for the customer from all the customer's communications in memory over time, such that the composite score consists of four numbers, each representing the average of a different emotion factor value over time. Emotion propensity model 220 may classify the customer into an emotional profile with other customers who have similar and/or identical emotion factor value averages for their communications over time.

In some examples, a business-rule emotion propensity model 220 may classify a customer into an emotional profile based on a single average emotion factor value over time. For example, if an average inquisitiveness score as classified by inquisitiveness model 14 for communications from a customer is two, where two represents is the highest level inquisitiveness that inquisitiveness model will classify a communication into, then emotion propensity model 220 may classify the customer associated with the communications into an emotional profile for individuals who may be very curious. In another example, emotion propensity model 220 may classify a customer with communications having an average aggressiveness score as two into an emotional profile for individuals who may be easily angered.

Customer engagement system 222 may determine a probability that a customer will respond positively to customer engagement based on at least an emotional profile of the customer (514). Emotion propensity model 220 may output the emotional profile classification or the emotion propensity score to customer engagement system 222, or customer engagement system 222 may retrieve the emotional profile or emotion propensity score from emotional profiles database 414. Customer engagement system 222 may retrieve a plurality of inputs, including the emotional profile for a customer, the most recent set of emotion factor values for a communication from the customer, an emotion propensity score, a number of failed or successful previous solicitation attempts with the customer, user experience ratings from the customer on communications with the organization or business, and any other data helpful for an agent to or automatic system to use in solicitation.

In some examples, customer engagement system 222 may determine that a group of customers in an emotional profile associated with customers who are curious have a high probability of responding positively to solicitation. In other examples, customer engagement system 222 determine that a customer who falls in the aforementioned group has a low probability of responding positively to solicitation, because the most recent emotion factor values for that customer, when evaluated alone, indicate that the customer would not be receptive to solicitation. For example, a customer may generally be classified into an emotional profile as someone receptive to solicitation, but have had a recent bad experience with customer service, resulting in a high aggression score for their most recent communication. In this case customer engagement system 222 may determine that there is a low probability the customer would respond positively to solicitation for a new product or service. In other examples, customer engagement system 222 may determine a customer who is classified into an emotional profile indicative of aggressive individuals has a high probability of responding positively to solicitation based on a history of successful solicitation attempts on the customer.

Customer engagement system 222 may be an in-house or third-party vendor product used by the business or organization to manage customer solicitation and other forms of customer engagement based on a variety of input data. For example, customer engagement system 222 includes one or more IVRs 226 that may be configured to automatically respond and/or interact with a customer based on the emotional profile of the customer. Similarly, customer engagement system 222 includes one or more agent devices 224 operated by human agents that may be configured to display or otherwise provide the customer's emotional profile to the human agents and/or automatically provide prompts to the human agents on how to respond and/or interact with the customer based on the customer's emotional profile.

In some examples, customer engagement system 222 retrieves an emotion propensity score from emotional profiles database 414 and maps the emotion propensity score to an emotional profile before determining a probability that a customer will respond positively to a particular type of customer engagement. In this way, customer engagement system 222 may determine an emotional profile for the customer to use in determining a probability that the customer will respond positively to a particular type of customer engagement.

In some examples, emotion propensity model 220 has classified a customer into one or more emotional profiles indicating that the customer may respond positively or negatively to a variety of types of customer engagement. For example, customers in a first emotional profile may respond positively to very animated speaking styles, or customers in a second emotional profile may respond positively to a slow, clear speaking style. In examples where multiple emotional profiles are available for a customer indicating a customer's propensity for multiple different engagement styles, customer engagement system 222 may retrieve one or more of the emotional profiles for a customer and determine a probabilistically best engagement style for an agent when interacting with the customer. For example, in this way customer engagement system 222 may determine a higher probability that a customer will respond positively to solicitations to open a new bank account using a slow, clear speaking style.

Figure 6:
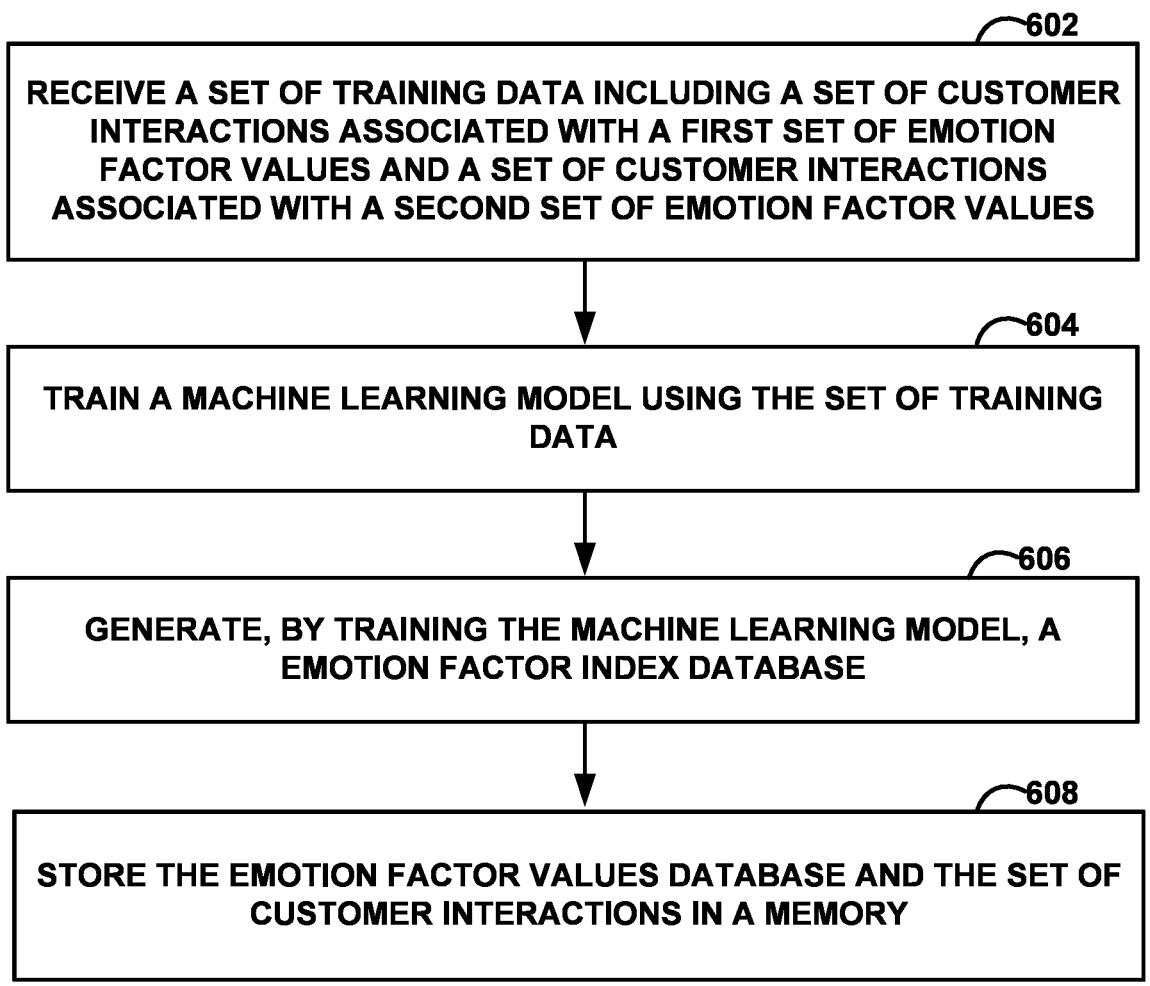
FIG. 6 is a flow diagram illustrating an example process for training an emotion-based indexer machine learning model, in accordance with the techniques of this disclosure.

FIG. 6 is a flow diagram illustrating an example process for training an emotion-based indexer machine learning model, in accordance with the techniques of this disclosure. The example operation of FIG. 6 is described with respect to computing system 300 of FIG. 3 including DIVA indexer 10 and training unit 320. The emotion-based indexer may comprise determination model 12, inquisitiveness model 14, valence model 16, and aggression model 18 within DIVA indexer 10. Each model within DIVA indexer 10 may need to be trained individually with communication data labeled with their respective emotion factor values.

Training unit 320 may receive a set of training data 312 including data indicative of a first set of communication data associated with a first set of emotion factor values and at least a second set of communication data associated with a second set of emotion factor values (602). The sets of emotion factor values may each be comprised of a determination value, an inquisitiveness value, a valence value, and an aggression value, where each emotion factor value is comprised of an integer between negative two and two inclusive. In some examples, the first set of emotion factor values has different integer values than the second set of emotion factor values. In some examples, the set of communication data associated with the first set of emotion factor values may be approximately equal in size to the set of communication data associated with the second set of emotion factor values.

Training unit 320 may train the machine learning models within DIVA indexer 10 using training data 312 (604). Determination model 12 may be trained to determine a determination value based on input communication data representing a message. A machine learning model may be trained using a training process to create a data-specific model, such as determination model 12, based on training data 312. After the training process, determination model 12 may be capable of outputting a determination value representing a level of determination emotion in a message based on an input of communication data. The training process may implement a set of training data (e.g., training data 312) to create determination model 12.

Training data 312 may include a plurality of sets of communication data and emotion factor values as described above, wherein the determination values from the sets of emotion factor values are used to train determination model 12. The plurality of sets of communication data may include a group of communication data labeled with a determination value of negative 2, a group of communication data labeled with a determination value of negative one, a group of communication data labeled with a determination value of zero, a group of communication data labeled with a determination value of one, and a group of communication data labeled with a determination value of two, where each group of communication data of the plurality of sets of communication data is known to be labeled with a determination value of negative two, negative one, zero, one, or two. In one example, training data 312 contains data representing about equal numbers of sets of communication data labeled with determination values of each number negative two through two. In another example, training data 312 contains data including a greater number of sets of communication data labeled with a determination value of two than sets of communication data labeled with a determination value of zero. Other examples are contemplated wherein training data 312 contains data including an equal to or greater number of sets of communication data labeled with any particular determination value than a number of sets of communication data labeled with any other particular determination value. Training unit 320 may access training data 312 stored in storage units 310, and training unit 320 may train determination model 12 using training data 312.

Inquisitiveness model 14 may be trained to determine an inquisitiveness value based on input communication data representing a message. A machine learning model may be trained using a training process to create a data-specific model, such as inquisitiveness model 14, based on training data 312. After the training process, inquisitiveness model 14 may be capable of outputting an inquisitiveness value representing a level of inquisitiveness emotion in a message based on an input of communication data. The training process may implement a set of training data (e.g., training data 312) to create inquisitiveness model 14.

Training data 312 may include a plurality of sets of communication data and emotion factor values as described above, wherein the inquisitiveness values from the sets of emotion factor values are used to train inquisitiveness model 14. The plurality of sets of communication data may include a group of communication data labeled with an inquisitiveness value of negative 2, a group of communication data labeled with an inquisitiveness value of negative one, a group of communication data labeled with an inquisitiveness value of zero, a group of communication data labeled with an inquisitiveness value of one, and a group of communication data labeled with an inquisitiveness value of two, where each group of communication data of the plurality of sets of communication data is known to be labeled with an inquisitiveness value of negative two, negative one, zero, one, or two. In one example, training data 312 contains data representing about equal numbers of sets of communication data labeled with inquisitiveness values of each number negative two through two. In another example, training data 312 contains data including a greater number of sets of communication data labeled with an inquisitiveness value of two than sets of communication data labeled with an inquisitiveness value of zero. Other examples are contemplated wherein training data 312 contains data including an equal to or greater number of sets of communication data labeled with any particular inquisitiveness value than a number of sets of communication data labeled with any other particular inquisitiveness value. Training unit 320 may access training data 312 stored in storage units 310, and training unit 320 may train inquisitiveness model 14 using training data 312.

Valence model 16 may be trained to determine a valence value based on input communication data representing a message. A machine learning model may be trained using a training process to create a data-specific model, such as valence model 16, based on training data 312. After the training process, valence model 16 may be capable of outputting a valence value representing a level of valence emotion in a message based on an input of communication data. The training process may implement a set of training data (e.g., training data 312) to create valence model 16.

Training data 312 may include a plurality of sets of communication data and emotion factor values as described above, wherein the valence values from the sets of emotion factor values are used to train valence model 16. The plurality of sets of communication data may include a group of communication data labeled with a valence value of negative 2, a group of communication data labeled with a valence value of negative one, a group of communication data labeled with a valence value of zero, a group of communication data labeled with a valence value of one, and a group of communication data labeled with a valence value of two, where each group of communication data of the plurality of sets of communication data is known to be labeled with a valence value of negative two, negative one, zero, one, or two. In one example, training data 312 contains data representing about equal numbers of sets of communication data labeled with valence values of each number negative two through two. In another example, training data 312 contains data including a greater number of sets of communication data labeled with a valence value of two than sets of communication data labeled with a valence value of zero. Other examples are contemplated wherein training data 312 contains data including an equal to or greater number of sets of communication data labeled with any particular valence value than a number of sets of communication data labeled with any other particular valence value. Training unit 320 may access training data 312 stored in storage units 310, and training unit 320 may train valence model 16 using training data 312.

Aggression model 18 may be trained to determine an aggression value based on input communication data representing a message. A machine learning model may be trained using a training process to create a data-specific model, such as aggression model 18, based on training data 312. After the training process, aggression model 18 may be capable of outputting an aggression value representing a level of aggression emotion in a message based on an input of communication data. The training process may implement a set of training data (e.g., training data 312) to create aggression model 18.

Training data 312 may include a plurality of sets of communication data and emotion factor values as described above, wherein the aggression values from the sets of emotion factor values are used to train aggression model 18. The plurality of sets of communication data may include a group of communication data labeled with an aggression value of negative 2, a group of communication data labeled with an aggression value of negative one, a group of communication data labeled with an aggression value of zero, a group of communication data labeled with an aggression value of one, and a group of communication data labeled with an aggression value of two, where each group of communication data of the plurality of sets of communication data is known to be labeled with an aggression value of negative two, negative one, zero, one, or two. In one example, training data 312 contains data representing about equal numbers of sets of communication data labeled with aggression values of each number negative two through two. In another example, training data 312 contains data including a greater number of sets of communication data labeled with an aggression value of two than sets of communication data labeled with an aggression value of zero. Other examples are contemplated wherein training data 312 contains data including an equal to or greater number of sets of communication data labeled with any particular aggression value than a number of sets of communication data labeled with any other particular aggression value. Training unit 320 may access training data 312 stored in storage units 310, and training unit 320 may train aggression model 18 using training data 312.

By training the machine learning models within DIVA indexer 10, training unit 320 may generate an emotion factor index database 22 (606). The emotion factor index database 22 may include a plurality of emotion factor value sets, where each emotion factor value set of the plurality of emotion factor value sets corresponds to a respective message or communication data. Communication data may include words of the English language or other languages, single numerals, groups of single numerals, numerical strings, groups of numerical strings, single characters, groups of single characters, character strings, or groups of character strings in plain text format. As such, using emotion factor index database 22, the machine learning models within DIVA indexer 10 may determine a set of emotion factor values for a message or communication data. Training unit 320 may store emotion factor index database 22 in storage units 310 (608).

Figure 7:
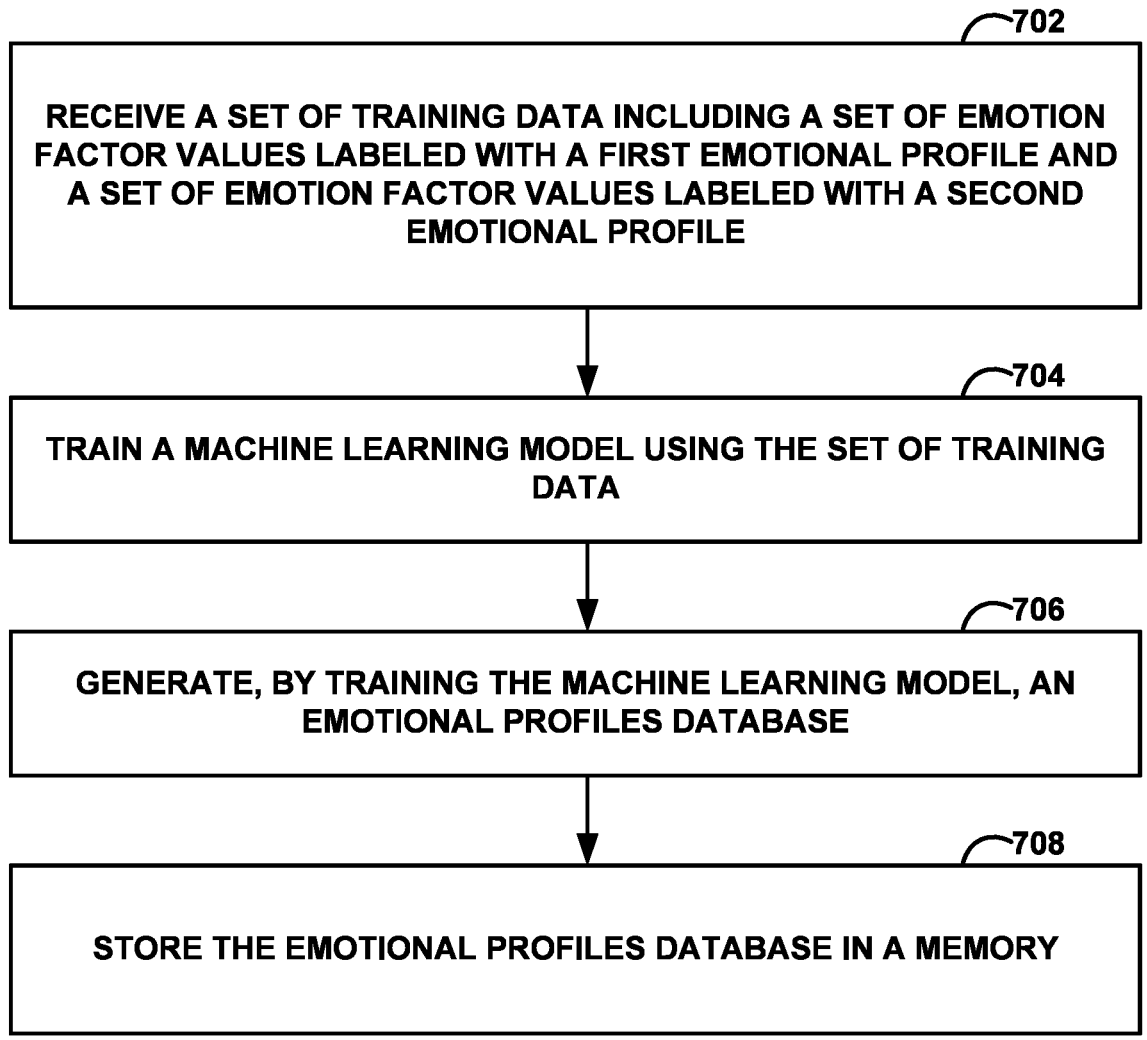
FIG. 7 is a flow diagram illustrating an example process for training an emotion propensity model, in accordance with the techniques of this disclosure.

FIG. 7 is a flow diagram illustrating an example process for training an emotion propensity model, in accordance with the techniques of this disclosure. The example operation of FIG. 7 is described with respect to computing system 400 of FIG. 4 including emotion propensity model 220 as a machine learning model, and training unit 420.

In a first example, an emotion propensity model 220 machine learning model may be trained to classify a customer into an emotional profile according to the customer's typical emotional response during customer communications based on one or more sets of emotion factor values for the communication data associated with the customer over time.

In a second example, emotion propensity model 220 may be trained to determine an emotion propensity score quantifying the customer's preference for a particular type of customer engagement based on one or more sets of emotion factor values for the communication data associated with the customer over time.

In a first example, training unit 420 may receive a set of training data 412 including a group of sets of emotion factor values associated with customer communications and labeled with a first emotional profile, and a group of sets of emotion factor values associated with customer communications and labeled with a second emotional profile (702). In some examples, the group of sets of emotion factor values labeled with the first emotional profile may be approximately equal in size to the group of sets of emotion factor values labeled with the second emotional profile.

In a second example, training unit 420 may receive a set of training data 412 including a group of sets of emotion factor values associated with customer communications for a particular type of customer engagement and labeled with a first emotion propensity score for that particular type of customer engagement, and a group of sets of emotion factor values associated with customer communications for the particular type of customer engagement and labeled with a second emotion propensity score for that particular type of customer engagement. In some examples, the first emotion propensity score is higher than the second emotion propensity score. In some examples, the group of sets of emotion factor values labeled with the first emotion propensity score may be approximately equal in size to the group of sets of emotion factor values labeled with the second emotion propensity score.

Training unit 420 may train emotion propensity model 220 using training data 412 (704). In a first example, emotion propensity model 220 may be trained to classify a customer into an emotional profile according to the customer's typical emotional response during customer communications based on one or more sets of emotion factor values for the communication data associated with the customer over time. In a second example, emotion propensity model 220 may be trained to determine an emotion propensity score quantifying the customer's preference for a particular type of customer engagement. A machine learning algorithm may be trained using a training process to create a data-specific model, such as emotion propensity model 220 based on training data 412. After the training process, emotion propensity model 220 may be capable of classifying a customer into an emotional profile based on one or more sets of emotion factor values, or emotion propensity model may be capable of determining an emotion propensity score based on one or more sets of emotion factor values. The training process may implement a set of training data (e.g., training data 412) to create the emotion propensity model 220.

In a first example, training data 412 may include data indicative of a plurality of sets of emotion factor values labeled with a plurality of emotional profiles as described above, wherein the plurality of sets of emotion factor values labeled with a plurality of emotional profiles comprises a first set of emotion factor values labeled with a first emotional profile and at least a second set of emotion factor values labeled with a second emotional profile. The plurality of sets of emotion factor values may include a particular number of groups (e.g., ten groups) of sets of emotion factor values where each of the groups includes data that is labeled with a particular emotional profile. In one example, training data 412 contains data representing about equal numbers of sets of emotion factor values labeled with each emotional profile. In another example, training data 412 contains data including a greater number of sets of emotion factor values labeled with a first emotional profile than a number of sets of emotion factor values labeled with a second emotional profile. Other examples are contemplated wherein training data 412 contains data including a greater number of sets of emotion factor values labeled with any particular emotional profile than a number of sets of emotion factor values labeled with any other particular emotional profile. Training unit 420 may access training data 412 stored in storage units 410, and training unit 420 may train the emotion propensity model 220 using training data 412.

In a second example, training data 412 may include data indicative of a plurality of sets of emotion factor values labeled with a plurality of emotion propensity scores as described above, wherein the plurality of sets of emotion factor values labeled with a plurality of emotion propensity scores comprises a first set of emotion factor values labeled with a first emotion propensity score and at least a second set of emotion factor values labeled with a second emotion propensity score. The plurality of sets of emotion factor values may include a particular number of groups (e.g., ten groups) of sets of emotion factor values where each of the groups includes data that is labeled with a particular emotion propensity score (e.g., zero through one). In one example, training data 412 contains data representing about equal numbers of sets of emotion factor values labeled with each emotion propensity score. In another example, training data 412 contains data including a greater number of sets of emotion factor values labeled with a first emotion propensity score than a number of sets of emotion factor values labeled with a second emotion propensity score. Other examples are contemplated wherein training data 412 contains data including a greater number of sets of emotion factor values labeled with any particular emotion propensity score than a number of sets of emotion factor values labeled with any other particular emotion propensity score. Training unit 420 may access training data 412 stored in storage units 410, and training unit 420 may train the emotion propensity model 220 using training data 412.

By training emotion propensity model 220, training unit 420 may generate an emotional profiles database 414 (706). The emotional profiles database 414 may include a plurality of emotional profiles, where each emotional profile of the plurality of emotional profiles corresponds to a respective set of emotion factor values associated with customer communications, each emotional profile of the plurality of emotional profiles is associated with one or more customers having congruent emotion factor values with one another, and each emotional profile of the plurality of emotional profiles corresponds to a respective propensity score. As such, using emotional profiles database 414, emotion propensity model 220 may classify a customer into an emotional profile according to the customer's typical emotional response during customer communications, or assign a propensity score that quantifies the customer's preference for a particular type of customer engagement. Training unit 420 may store emotional profiles database 414 in storage units 410 (708).

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing system comprising:
   a memory; and
   one or more processors in communication with the memory and configured to:
   train each machine learning model of a set of machine learning models included in an emotion-based indexer based on a first set of training data, wherein each machine learning model is trained to determine a measure of a different emotion in customer communications as a different emotion factor value;
   apply communication data of a given customer communication associated with a customer to the emotion-based indexer;
   generate, as output from the emotion-based indexer, a set of emotion factor values for the given customer communication, wherein the set of emotion factor values comprises a determination value for the given customer communication, an inquisitiveness value for the given customer communication, a valence value for the given customer communication, and an aggression value for the given customer communication;
   retrieve, from a database, one or more sets of emotion factor values for communication data associated with the customer over time, the one or more sets of emotion factor values including the set of emotion factor values for the given customer communication;
   classify, using an emotion propensity model running on the one or more processors, the customer into an emotional profile according to a typical emotional response of the customer during customer communications based on the one or more sets of emotion factor values for the communication data associated with the customer over time, wherein the emotion propensity model comprises a machine learning model trained on a second set of training data;
   determine a probability that the customer will respond positively to a particular type of customer engagement based on the emotional profile for the customer; and
   re-train the emotion propensity model based on an updated second set of training data, wherein the updated second set of training data includes an updated plurality of customer communications, wherein each customer communication in the updated plurality of customer communications comprises a set of emotion factor values and a label identifying an emotional profile for a customer associated with the customer communication, and wherein the updated plurality of customer communications includes the given customer communication.

2. The computing system of claim 1, wherein the one or more processors are further configured to:
receive the communication data of the given customer communication, wherein the communication data comprises a string of characters;
apply the communication data to the emotion-based indexer as input;
generate, as output from the emotion-based indexer, the set of emotion factor values for the given customer communication; and
store the set of emotion factor values for the given customer communication in the database.

3. The computing system of claim 1, wherein the emotional profile includes one or more other customers having congruent emotion factor values with the customer.

4. The computing system of claim 1, wherein each of the one or more sets of emotion factor values for the communication data associated with the customer comprise:
a determination value;
an inquisitiveness value;
a valence value; and
an aggression value.

5. The computing system of claim 1, wherein to classify the customer, the one or more processors are configured to:
apply the one or more sets of emotion factor values for the communication data to the emotion propensity model as input; and
indicate, as output from the emotion propensity model, the emotional profile for the customer.

6. The computing system of claim 5, wherein the one or more processors are configured to:
create the second set of training data that includes a plurality of customer communications, wherein each customer communication comprises an associated set of emotion factor values and a label identifying an associated emotional profile for a customer associated with the customer communication; and
train the machine learning model of the emotion propensity model based on the second set of training data.

7. The computing system of claim 1, wherein the machine learning model of the emotion propensity model comprises a machine learning model trained for the particular type of customer engagement, and wherein to classify the customer, the one or more processors are configured to:
apply the one or more sets of emotion factor values for the communication data to the emotion propensity model as input;
determine, as output from the emotion propensity model, an emotion propensity score that quantifies a customer's preference for the particular type of customer engagement; and
map the emotion propensity score to the emotion profile for the customer.

8. The computing system of claim 7, wherein the one or more processors are configured to:
create the second set of training data that includes a plurality of customer communications representative of the particular type of customer engagement, wherein each customer communication comprises an associated set of emotion factor values and a label indicating a preference for the particular type of customer engagement; and
train the machine learning model of the emotion propensity model based on the second set of training data.

9. The computing system of claim 1, wherein the one or more processors receive at least a first set of emotion factor values for communication associated with the customer having a first time stamp, and a second set of emotion factor values for communication associated with the customer having a second time stamp, and wherein to classify the customer, the one or more processors are configured to:
compute a composite score for each of the first set of emotion factor values and the second set of emotion factor values; and
classify the customer into the emotional profile based on one or more composite scores for the communication data associated with the customer over time.

10. The computing system of claim 1, wherein the one or more processors receive at least a first set of emotion factor values for communication associated with the customer having a first time stamp, and a second set of emotion factor values for communication associated with the customer having a second time stamp, and wherein to classify the customer, the one or more processors are configured to:
extract an inquisitiveness value from each of the first set of emotion factor values and the second set of emotion factor values; and
classify the customer into the emotional profile based on one or more inquisitiveness values for the communication data associated with the customer over time.

11. The computing system of claim 1, wherein the particular type of customer engagement comprises one of new product solicitation communications or an emotional style of customer interaction communications.

12. A method comprising:
training, by one or more processors, each machine learning model of a set of machine learning models included in an emotion-based indexer based on a first set of training data, wherein each machine learning model is trained to determine a measure of a different emotion in customer communications as a different emotion factor value;
applying communication data of a given customer communication associated with a customer to the emotion-based indexer;
generating, as output from the emotion-based indexer, a set of emotion factor values for the given customer communication, wherein the set of emotion factor values comprises a determination value for the given customer communication, an inquisitiveness value for the given customer communication, a valence value for the given customer communication, and an aggression value for the given customer communication;
retrieving from a database, by the one or more processors, one or more sets of emotion factor values for communication data associated with the customer over time, the one or more sets of emotion factor values including the set of emotion factor values for the given customer communication;
classifying, using an emotion propensity model running on the one or more processors, the customer into an emotional profile according to a typical emotional response of the customer during customer communications based on the one or more sets of emotion factor values for the communication data associated with the customer over time, wherein the emotion propensity model comprises a machine learning model trained on a second set of training data;
determining a probability that the customer will respond positively to a particular type of customer engagement based on the emotional profile for the customer; and
re-training the emotion propensity model based on an updated second set of training data, wherein the updated second set of training data includes an updated plurality of customer communications, wherein each customer communication in the updated plurality of customer communications comprises a set of emotion factor values and a label identifying an emotional profile for a customer associated with the customer communication, and wherein the updated plurality of customer communications includes the given customer communication.

13. The method of claim 12, further comprising:
receiving, by the one or more processors, the communication data of the given customer communication, wherein the communication data comprises a string of characters;
applying the communication data to the emotion-based indexer as input;
generating, as output from the emotion-based indexer, the set of emotion factor values for the given customer communication; and
storing the set of emotion factor values for the given customer communication in the database.

14. The method of claim 12, wherein to classify the customer, the method further comprises:
applying, by the one or more processors, the one or more sets of emotion factor values for the communication data to the emotion propensity model as input; and
indicating, as output from the emotion propensity model, the emotional profile for the customer.

15. The method of claim 14, wherein the method further comprises:
creating, by the one or more processors, the second set of training data that includes a plurality of customer communications, where each customer communication comprises an associated set of emotion factor values and a label identifying an associated emotional profile for a customer associated with the customer communication; and
training the machine learning model of the emotion propensity model based on the second set of training data.

16. The method of claim 12, wherein the machine learning model of the emotion propensity model comprises a machine learning model trained for the particular type of customer engagement, and wherein to classify the customer, the method further comprises:
applying, by the one or more processors, the one or more sets of emotion factor values for the communication data to the emotion propensity model as input;
determining, as output from the emotion propensity model, an emotion propensity score that quantifies a customer's preference for the particular type of customer engagement; and
mapping the emotion propensity score to the emotional profile for the customer.

17. The method of claim 16, wherein the method further comprises:
creating, by the one or more processors, the second set of training data that includes a plurality of customer communications representative of the particular type of customer engagement, wherein each customer communication comprises an associated set of emotion factor values and a label indicating a preference for the particular type of customer engagement; and
training the machine learning model of the emotion propensity model based on the second set of training data.

18. The method of claim 12, wherein retrieving the one or more sets of emotion factor values associated with the customer over time comprises retrieving at least a first set of emotion factor values for communication associated with the customer having a first time stamp and a second set of emotion factor values for communication associated with the customer having a second time stamp, and
wherein classifying the customer further comprises:
computing, by the one or more processors, a composite score for each of the first set and second set of emotion factor values; and
classifying the customer into the emotional profile based on one or more composite scores for the communication data associated with the customer over time.

19. The method of claim 12,
wherein retrieving the one or more sets of emotion factor values associated with the customer over time comprises retrieving at least a first set of emotion factor values for communication associated with the customer having a first time stamp and a second set of emotion factor values for communication associated with the customer having a second time stamp, and
wherein classifying the customer further comprises:
extracting, by the one or more processors, an inquisitiveness value from each of the first set and the second set of emotion factor values; and
classifying the customer into the emotional profile based on one or more inquisitiveness values for the communication data associated with the customer over time.

20. A computer-readable medium comprising instructions that, when executed, cause one or more processors to:
train each machine learning model of a set of machine learning models included in an emotion-based indexer based on a first set of training data, wherein each machine learning model is trained to determine a measure of a different emotion in customer communications as a different emotion factor value;
apply communication data of a given customer communication associated with a customer to the emotion-based indexer;
generate, as output from the emotion-based indexer, a set of emotion factor values for the given customer communication, wherein the set of emotion factor values comprises a determination value for the given customer communication, an inquisitiveness value for the given customer communication, a valence value for the given customer communication, and an aggression value for the given customer communication;
retrieve, from a database, one or more sets of emotion factor values for communication data associated with the customer over time, the one or more sets of emotion factor values including the set of emotion factor values for the given customer communication;
classify, using an emotion propensity model running on the one or more processors, the customer into an emotional profile according to a typical emotional response of the customer during customer communications based on the one or more sets of emotion factor values for the communication data associated with the customer over time, wherein the emotion propensity model comprises a machine learning model trained on a second set of training data;

determine a probability that the customer will respond positively to a particular type of customer engagement based on the emotional profile for the customer; and re-train the emotion propensity model based on an updated second set of training data; wherein the updated second set of training data includes an updated plurality of customer communications, wherein each customer communication in the updated plurality of customer communications comprises a set of emotion factor values and a label identifying an emotional profile for a customer associated with the customer communication, and wherein the updated plurality of customer communications includes the given customer communication.

\* \* \* \* \*